(12) United States Patent
Liang et al.

(10) Patent No.: US 12,490,625 B2
(45) Date of Patent: Dec. 2, 2025

(54) TOUCH DISPLAY SUBSTRATE AND TOUCH DISPLAY APPARATUS

(71) Applicant: BOE Technology Group Co., Ltd., Beijing (CN)

(72) Inventors: Ke Liang, Beijing (CN); Kemeng Tong, Beijing (CN); Fei Fang, Beijing (CN); Jun Yan, Beijing (CN); Kening Zheng, Beijing (CN); Jingquan Wang, Beijing (CN); Xinguo Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/033,350

(22) PCT Filed: May 5, 2022

(86) PCT No.: PCT/CN2022/090897
§ 371 (c)(1),
(2) Date: Apr. 23, 2023

(87) PCT Pub. No.: WO2023/212850
PCT Pub. Date: Nov. 9, 2023

(65) Prior Publication Data
US 2024/0381733 A1  Nov. 14, 2024

(51) Int. Cl.
*H10K 59/40* (2023.01)
*G06F 3/044* (2006.01)
(Continued)

(52) U.S. Cl.
CPC .......... *H10K 59/40* (2023.02); *G06F 3/0446* (2019.05); *H10K 59/1213* (2023.02);
(Continued)

(58) Field of Classification Search
CPC .............. G06K 9/0004; G06V 40/1318; G06F 3/0446; G06F 3/0443; G06F 3/0445
See application file for complete search history.

(56) References Cited

U.S. PATENT DOCUMENTS

2015/0227236 A1  8/2015  Lee et al.
2018/0059862 A1  3/2018  Zeng et al.
(Continued)

FOREIGN PATENT DOCUMENTS

CN  106951125 A  7/2017
CN  110491909 A  11/2019
(Continued)

OTHER PUBLICATIONS

Office Action dated Nov. 30, 2022 for Chinese Patent Application No. 202280001101.3 and English Translation.
(Continued)

*Primary Examiner* — Yuzhen Shen
(74) *Attorney, Agent, or Firm* — Ling Wu; Stephen Yang; Ling and Yang Intellectual Property

(57) ABSTRACT

A touch display substrate and a touch display apparatus are provided. The touch display substrate including: a display region and a non-display region, the display region including a first display region and a second display region, the first display region surrounding at least one side of the second display region; the touch display substrate includes a base substrate and a display structure layer and a touch structure layer disposed on the base substrate sequentially; the first display region includes a first touch assembly, and the second display region includes a second touch assembly; the display structure layer includes multiple pixel circuits located in the first display region and multiple light emitting elements located in the first display region and second display region; the first touch assembly is located in the touch structure layer, and the second touch assembly is
(Continued)

located in the display structure layer and/or the touch structure layer.

17 Claims, 15 Drawing Sheets

(51) Int. Cl.
    *H10K 59/121*     (2023.01)
    *H10K 59/122*     (2023.01)
    *H10K 59/131*     (2023.01)
    *H10K 59/65*     (2023.01)
    *H10K 59/80*     (2023.01)

(52) U.S. Cl.
    CPC ......... *H10K 59/122* (2023.02); *H10K 59/131* (2023.02); *H10K 59/65* (2023.02); *H10K 59/873* (2023.02); *H10K 59/8792* (2023.02)

(56) References Cited

U.S. PATENT DOCUMENTS

| | | | |
|---|---|---|---|
| 2021/0065625 A1* | 3/2021 | Wang | G09G 3/3233 |
| 2021/0376003 A1 | 12/2021 | Xu et al. | |
| 2022/0013597 A1 | 1/2022 | Liu et al. | |
| 2022/0100321 A1 | 3/2022 | Choi | |
| 2022/0129096 A1 | 4/2022 | Dai et al. | |
| 2022/0406851 A1* | 12/2022 | Lee | H10K 59/352 |
| 2023/0152927 A1 | 5/2023 | Peng | |
| 2023/0205373 A1* | 6/2023 | Han | G06F 3/0443 345/173 |
| 2023/0259239 A1* | 8/2023 | Kim | H05K 1/189 345/173 |
| 2023/0341965 A1* | 10/2023 | Kim | G06F 3/0445 |
| 2024/0028153 A1* | 1/2024 | Ma | G06F 3/04164 |

FOREIGN PATENT DOCUMENTS

| | | | | |
|---|---|---|---|---|
| CN | 111367430 A | | 7/2020 | |
| CN | 111430439 A | | 7/2020 | |
| CN | 111584571 A | | 8/2020 | |
| CN | 111596800 A | | 8/2020 | |
| CN | 111752417 A | * | 10/2020 | ........... G06F 3/0412 |
| CN | 111857445 A | | 10/2020 | |
| CN | 112038373 A | * | 12/2020 | ......... H01L 27/3225 |
| CN | 112269490 A | | 1/2021 | |
| CN | 113299201 A | | 8/2021 | |
| CN | 114003143 A | | 2/2022 | |
| CN | 114005859 A | | 2/2022 | |
| CN | 114281206 A | | 4/2022 | |
| CN | 114335125 A | | 4/2022 | |
| CN | 115268676 A | | 11/2022 | |
| WO | 2022007055 A1 | | 1/2022 | |
| WO | 2022042046 A1 | | 3/2022 | |

OTHER PUBLICATIONS

Office Action dated Mar. 24, 2023 for Chinese Patent Application No. 202280001101.3 and English Translation.
Notification to Grant an Invention Patent dated May 30, 2023 for Chinese Patent Application No. 202280001101.3 and English Translation.
European Search Report for 22940546.9 Mailed May 8, 2025.

* cited by examiner

TOUCH DISPLAY SUBSTRATE AND TOUCH DISPLAY APPARATUS

CROSS-REFERENCE TO RELATED APPLICATIONS

The present application is a U.S. National Phase Entry of International Application PCT/CN2022/090897 having an international filing date of May 5, 2022, and the contents disclosed in the above-mentioned application are hereby incorporated as a part of this application.

TECHNICAL FIELD

The present disclosure relates to, but is not limited to, the field of touch display technology, and specifically to a touch display substrate and a touch display apparatus.

BACKGROUND

Organic Light Emitting Diode (OLED) is an active light emitting display component with advantages of self-illumination, wide viewing angle, high contrast, low power consumption, and extremely high response speed, etc. With the continuous development of display technology, a flexible display device with OLED as a light emitting device and Thin Film Transistor (TFT) for implementing signal control has become a mainstream product in the display field at present.

At present, a concept of full-screen mobile phone has been widely concerned in a mobile phone market, and it is also a development direction of mobile phones in the future. In this full-screen mobile phone, a camera may be hidden so that a front visible region is almost all the screen, so that a user gets a better display effect.

SUMMARY

The following is a summary of subject matters described herein in detail. The summary is not intended to limit the protection scope of claims.

In a first aspect, the present disclosure provides a touch display base substrate, including: a display region and a non-display region, wherein the display region includes a first display region and a second display region, wherein the first display region surrounds at least one side of the second display region; the touch display substrate includes a base substrate and a display structure layer and a touch structure layer disposed on the base substrate sequentially; the first display region includes a first touch assembly, and the second display region includes a second touch assembly; the display structure layer includes multiple pixel circuits located in the first display region and multiple light emitting elements located in the first display region and the second display region; the first touch assembly is located in the touch structure layer, and the second touch assembly is located in the display structure layer and/or the touch structure layer.

In some possible implementations, the light emitting element includes a first light emitting element disposed in the first display region and a second light emitting element disposed in the second display region, and the display structure layer includes multiple first sub-pixels located in the first display region and multiple second sub-pixels located in the second display region; the first sub-pixel includes a first pixel circuit and a first light emitting element connected with the first pixel circuit, and the second sub-pixel includes a second light emitting element, wherein the first pixel circuit is disposed in the first display region; multiple second sub-pixels constitute one pixel island, and a distance between adjacent pixel islands is greater than a distance between adjacent second sub-pixels located in a same pixel island.

In some possible implementations, the display structure layer further includes an anode connecting line, and the pixel circuit includes a second pixel circuit disposed in the first display region, wherein the second pixel circuit is connected with the second light emitting element through the anode connecting line, and the anode connecting line includes a transparent wire.

In some possible implementations, the second sub-pixel further includes a second pixel circuit connected with the second light emitting element, wherein the second pixel circuit is disposed in the second display region and an orthographic projection of it on the base substrate is overlapped with an orthographic projection of the pixel island on the base substrate.

In some possible implementations, the display structure layer includes a circuit structure layer and a light emitting structure layer which are sequentially stacked on the base substrate; the circuit structure layer includes a first pixel circuit and a second pixel circuit; the first pixel circuit and the second pixel circuit include a transistor; the circuit structure layer includes an active layer, a first insulating layer, a gate electrode, a second insulating layer, a source-drain electrode, a first planarization layer, an anode connecting line, and a second planarization layer which are sequentially stacked on the base substrate; the light emitting element includes an anode, a light emitting layer, and a cathode, and the light emitting structure layer includes a first light emitting element and a second light emitting element.

In some possible implementations, a cathode of the second light emitting element is a planar structure; or, the circuit structure layer further includes a cathode connecting line, cathodes of multiple second light emitting elements are in a block-shaped structure and disposed at an interval, wherein cathodes of adjacent second light emitting elements are electrically connected through the cathode connecting line, and the cathode connecting line is disposed in a same layer as the cathode and is a transparent wire.

In some possible implementations, the first touch assembly includes: multiple first touch structures extending along a first direction and multiple second touch structures extending along a second direction, wherein the multiple first touch structures are arranged along the second direction, and the multiple second touch structures are arranged along the first direction; a first touch structure includes multiple first touch electrodes and multiple first connecting parts, and a second touch structure includes multiple second touch electrodes and multiple second connecting parts, wherein the first direction and the second direction intersect, and a first touch electrode and a second touch electrode constitute a first touch electrode unit; the first touch electrode, the second touch electrode, and one connecting part of a first connecting part and a second connecting part are disposed in a same layer, and are disposed in a different layer from the other connecting part of the first connecting part and the second connecting part; the touch structure layer includes the first touch electrode, the second touch electrode, the first connecting part, and the second connecting part; the touch structure layer further includes a buffer layer, a touch insulating layer, and a protective layer which are sequentially stacked on the base substrate; the first touch electrode, the second touch electrode, and a connecting part disposed in the same layer as the first touch electrode are located between the touch insulating layer and the protective layer, and the connecting part disposed in the different layer from the first touch electrode is located between the buffer layer and the touch insulating layer; the first touch electrode and the second touch electrode are metal touch electrodes, the connecting part disposed in the same layer as the first touch electrode is a metal touch connecting part, and the connecting part disposed in the different layer from the first touch electrode may be a metal touch connecting part or a transparent touch connecting part.

In some possible implementations, the first touch assembly includes multiple first touch structures extending along a first direction and multiple second touch structures extending along the first direction, wherein the multiple first touch structures are arranged along a second direction, and the multiple second touch structures are arranged along the second direction; a first touch structure includes multiple first touch electrodes and multiple first connecting parts, and a second touch structure includes multiple second touch electrodes and multiple second connecting parts, wherein the first touch electrode and the second touch electrode are disposed alternately, the first direction and the second direction intersect, and the first touch electrode and the second touch electrode constitute a first touch electrode unit; the first touch electrode, the second touch electrode, the first connecting part, and the second connecting part are disposed in a same layer; the touch structure layer includes the first touch electrode, the second touch electrode, the first connecting part, and the second connecting part; the touch structure layer further includes a buffer layer and a protective layer which are sequentially stacked on the base substrate; the first touch electrode, the second touch electrode, the first connecting part, and the second connecting part are located between the buffer layer and the protective layer; the first touch electrode and the second touch electrode are metal touch electrodes, and the first connecting part and the second connecting part are metal touch connecting parts.

In some possible implementations, the second touch assembly includes multiple third touch structures and multiple fourth touch structures, wherein the multiple third touch structures are arranged along a second direction, and multiple fourth touch structures are arranged along a first direction; the third touch structure includes multiple third touch electrodes and multiple third connecting parts, and the fourth touch structure includes multiple fourth touch electrodes and multiple fourth connecting parts; a third touch electrode and a fourth touch electrode are alternately disposed along the second direction, and the third touch electrode and the fourth touch electrode constitute a second touch electrode unit; adjacent third touch structures are symmetrical with respect to a virtual straight line extending along the first direction, and adjacent fourth touch structures are symmetrical with respect to the virtual straight line extending along the first direction; and the third touch electrode, the fourth touch electrode, and one connecting part of a third connecting part and a fourth connecting part are disposed in a same layer, and are disposed in a different layer from the other connecting part of the third connecting part and the fourth connecting part.

In some possible implementations, the third connecting part extends along the first direction, and the fourth connecting part extends along the second direction; a shape of the third touch electrode includes one opening, openings of adjacent third touch electrodes arranged along the second direction are opposite, and the fourth touch electrode is located between two third touch electrodes with opposite openings and arranged along the second direction; and a shape of a region surrounded by the third touch electrode and an adjacent fourth touch electrode is adapted to a shape of the pixel island.

In some possible implementations, when the shape of the pixel island is a square, the third touch electrode includes a first electrode part, a second electrode part, and a third electrode part; the first electrode part and the third electrode part extend along the second direction, and the second electrode part extends along the first direction; one end of the first electrode part is electrically connected with one end of the second electrode part, the other end of the first electrode part is electrically connected with one end of the third electrode part of one adjacent third touch electrode through the third connecting part, the other end of the second electrode part is electrically connected with one end of the third electrode part, and the other end of the third electrode part is electrically connected with one end of the first electrode part of another adjacent third touch electrode through the third connecting part; the fourth touch electrode includes a fourth electrode part, a fifth electrode part, and a sixth electrode part; the fourth electrode part and the sixth electrode part extend along the second direction, and the fifth electrode part extends along the first direction; the fourth electrode part and the sixth electrode part are arranged along the first direction, and the fifth electrode part is electrically connected with a middle part of the fourth electrode part and a middle part of the sixth electrode part, respectively; one virtual straight line extending along the second direction passes through the first electrode part of the third touch electrode and the fourth electrode part of the fourth touch electrode, and another virtual straight line extending along the second direction passes through the third electrode part of the third touch electrode and the sixth electrode part of the fourth touch electrode.

In some possible implementations, when the first touch assembly includes multiple first touch structures extending along the first direction and multiple second touch structures extending along the second direction, the touch structure layer further includes the third touch electrode, the fourth touch electrode, the third connecting part, and the fourth connecting part; the third touch electrode, the fourth touch electrode, and the connecting part disposed in the same layer as the third touch electrode are located between the touch insulating layer and the protective layer, and the connecting part disposed in the different layer from the third touch electrode is located between the buffer layer and the touch insulating layer; the third touch electrode and the fourth touch electrode are metal touch electrodes, the connecting part disposed in the same layer as the third touch electrode is a metal touch connecting part, or the third touch electrode and the fourth touch electrode are transparent touch electrodes, and the connecting part disposed in the same layer as the third touch electrode is a transparent touch connecting part; and the connecting part disposed in the different layer from the third touch electrode is a metal touch connecting part or a transparent touch connecting part.

In some possible implementations, the first planarization layer includes a first sub-planarization layer and a second sub-planarization layer, the second sub-planarization layer being located at one side of the first sub-planarization layer away from the base substrate, the anode connecting line includes a first anode connecting line and a second anode connecting line disposed in different layers, wherein the first anode connecting line is located between the first sub-planarization layer and the second sub-planarization layer, and the second anode connecting line is located between the second sub-planarization layer and the second planarization layer; the display structure layer further includes the third touch electrode, the fourth touch electrode, the third connecting part and the fourth connecting part; the third touch electrode, the fourth touch electrode, and the connecting part disposed in the same layer as the third touch electrode are disposed in the same layer as the second anode connecting line, and the connecting part disposed in the different layer from the third touch electrode is disposed in a same layer as the first anode connecting line; the third touch electrode and the fourth touch electrode are transparent touch electrodes, and the third connecting part and the fourth connecting part are transparent touch connecting parts; an orthographic projection of the third touch electrode and the fourth touch electrode on the base substrate is at least partially overlapped with an orthographic projection of the light emitting layer on the base substrate.

In some possible implementations, when the first touch assembly includes multiple first touch structures extending along the first direction and multiple second touch structures extending along the second direction, when cathodes of adjacent light emitting elements are disposed at an interval, the touch structure layer further includes a third touch electrode, a fourth touch electrode, and the connecting part disposed in the same layer as the third touch electrode, and the display structure layer further includes the connecting part disposed in the different layer from the third touch electrode; the third touch electrode, the fourth touch electrode, and the connecting part disposed in the same layer as the third touch electrode are located between the touch insulating layer and the protective layer, and the connecting part disposed in the different layer from the third touch electrode is disposed in a same layer as an anode connecting line; the third touch electrode and the fourth touch electrode are metal touch electrodes, the connecting part disposed in the same layer as the third touch electrode is a metal touch connecting part, or the third touch electrode and the fourth touch electrode are transparent touch electrodes, and the connecting part disposed in the same layer as the third touch electrode is a transparent touch connecting part; the connecting part disposed in the different layer from the third touch electrode is a transparent touch connecting part; and the connecting part disposed in the different layer from the third touch electrode is electrically connected with a connected touch electrode through vias opened in the second planarization layer, a pixel defining layer, the buffer layer, and the touch insulating layer.

In some possible implementations, when the first touch assembly includes multiple first touch structures extending along the first direction and multiple second touch structures extending along the first direction, and the cathodes of the adjacent light emitting elements are disposed at the interval, the touch structure layer further includes the third touch electrode, the fourth touch electrode, and the connecting part disposed in the same layer as the third touch electrode, and the display structure layer further includes the connecting part disposed in the different layer from the third touch electrode; the third touch electrode, the fourth touch electrode, and the connecting part disposed in the same layer as the third touch electrode are located between the buffer layer and the protective layer, and the connecting part disposed in the different layer from the third touch electrode is disposed in the same layer as the anode connecting line; the third touch electrode and the fourth touch electrode are metal touch electrodes, the connecting part disposed in the same layer as the third touch electrode is a metal touch connecting part, or the third touch electrode and the fourth touch electrode are transparent touch electrodes, and the connecting part disposed in the same layer as the third touch electrode is a transparent touch connecting part; the connecting part disposed in the different layer from the third touch electrode is a transparent touch connecting part; and the connecting part disposed in the different layer from the third touch electrode is electrically connected with the connected touch electrode through vias opened in the second planarization layer, the pixel defining layer, and the buffer layer.

In some possible implementations, when the first touch assembly includes multiple first touch structures extending along the first direction and multiple second touch structures extending along the second direction, and the cathodes of the adjacent light emitting elements are disposed at the interval, the touch structure layer further includes the connecting part disposed in the different layer from the third touch electrode, and the display structure layer further includes the third touch electrode, the fourth touch electrode, and the connecting part disposed in the same layer as the third touch electrode; the connecting part disposed in the different layer from the third touch electrode is located between the buffer layer and the touch insulating layer, and the third touch electrode, the fourth touch electrode, and the connecting part disposed in the same layer as the third touch electrode are disposed in the same layer as the anode connecting line; the third touch electrode and the fourth touch electrode are transparent touch electrodes, the connecting part disposed in the same layer as the third touch electrode is a transparent touch connecting part, and the connecting part disposed in the different layer from the third touch electrode is a transparent touch connecting part or a metal touch connecting part; the connecting part disposed in the different layer from the third touch electrode is electrically connected with the connected touch electrode through vias opened in the second planarization layer, the pixel defining layer, and the buffer layer; and the orthographic projection of the third touch electrode and the fourth touch electrode on the base substrate is at least partially overlapped with the orthographic projection of the light emitting layer on the base substrate.

In some possible implementations, the second touch assembly includes multiple third touch structures extending along the first direction and multiple fourth touch structures extending along the first direction, wherein the multiple third touch structures are arranged along the second direction, the multiple fourth touch structures are arranged along the second direction, and the third touch structures and the fourth touch structures are alternately disposed along the second direction; a third touch structure includes multiple third touch electrodes and multiple third connecting parts, a fourth touch structure includes multiple fourth touch electrodes and multiple fourth connecting parts, and the third touch electrodes and the fourth touch electrodes constitute a second touch electrode unit; and the third touch electrode, the fourth touch electrode, the third connecting part, and the fourth connecting part are disposed in a same layer.

In some possible implementations, when the second touch assembly includes multiple first touch structures extending along the first direction and multiple second touch structures extending along the second direction, the touch structure layer further includes the third touch electrode, the fourth touch electrode, the third connecting part, and the fourth connecting part; the third touch electrode, the fourth touch electrode, the third connecting part, and the fourth connecting part are located between the touch insulating layer and the protective layer; and the third touch electrode and the fourth touch electrode are metal touch electrodes, the third connecting part and the fourth connecting part are metal touch connecting parts, or the third touch electrode and the fourth touch electrode are transparent touch electrodes, and the third connecting part and the fourth connecting part are transparent touch connecting parts.

In some possible implementations, when the second touch assembly includes multiple first touch structures extending along the first direction and multiple second touch structures extending along the first direction, the third touch electrode, the fourth touch electrode, the third connecting part, and the fourth connecting part are located between the buffer layer and the protective layer; and the third touch electrode and the fourth touch electrode are metal touch electrodes, the third connecting part and the fourth connecting part are metal touch connecting parts, or the third touch electrode and the fourth touch electrode are transparent touch electrodes, and the third connecting part and the fourth connecting part are transparent touch connecting parts.

In some possible implementations, the display structure layer further includes: the third touch electrode, the fourth touch electrode, the third connecting part, and the fourth connecting part; the third touch electrode, the fourth touch electrode, the third connecting part, and the fourth connecting part are disposed in a same layer as the anode connecting line; the third touch electrode and the fourth touch electrode are transparent touch electrodes, and the third connecting part and the fourth connecting part are transparent touch connecting parts; and the orthographic projection of the third touch electrode and the fourth touch electrode on the base substrate is at least partially overlapped with the orthographic projection of the light emitting layer on the base substrate.

In some possible implementations, the third touch structure and the fourth touch structure are symmetrical with respect to a virtual straight line extending along the first direction; and a shape of a region surrounded by the third touch structure and an adjacent fourth touch structure is adapted to a shape of the pixel island.

In some possible implementations, when the shape of the pixel island is a circle, the third touch electrode and the fourth touch electrode are strip-shaped electrodes, a virtual straight line extending along the second direction passes through the third touch electrode and the fourth touch electrode, and the virtual straight line extending along the second direction passes through the third connecting part and the fourth connecting part; the third connecting part and the fourth connecting part include a first straight line connecting part, a second straight line connecting part, a first non-straight line connecting part and a second non-straight line connecting part, wherein the first straight line connecting part and the second straight line connecting part extend along the second direction and arranged along the first direction; one end of the first straight line connecting part is connected to one end of the first non-straight line connecting part, and the other end of the first straight line connecting part is connected to one end of the second non-straight line connecting part; one end of the second straight line connecting part is connected to the other end of the first non-straight line connecting part, and one end of the second straight line connecting part is connected to the other end of the second non-straight line connecting part; the first non-straight line connecting part and the second non-straight line connecting part are symmetrical with respect to a virtual straight line extending along the first direction; a shape of the first non-straight line connecting part includes: a circular arc shape and a broken line shape formed by multiple straight line segments.

In some possible implementations, when the shape of the pixel island is the circle, the third touch structure and the fourth touch structure are symmetrical with respect to a virtual straight line extending along the first direction; shapes of the third touch electrode and the fourth touch electrode are circular arc shapes, and shapes of the third connecting part and the fourth connecting part are straight line shapes and extend along the first direction.

In some possible implementations, the anode connecting line includes: circular arc connecting parts and straight line connecting parts disposed at an interval; a bending direction of a circular arc connecting part is consistent with a bending direction of the third touch electrode, and the circular arc connecting part is disposed in parallel with the third touch electrode, and the straight line connecting part is disposed in parallel with the third connecting part and the fourth connecting part.

In some possible implementations, the pixel island is located in a region surrounded by the third touch electrode and an adjacent fourth touch electrode.

In some possible implementations, a density of the first touch electrode unit is greater than a density of the second touch electrode unit.

In some possible implementations, it further includes: a first touch trace, a second touch trace, a third touch trace, and a fourth touch trace located in the display structure layer; the first touch trace is electrically connected with the first touch electrode, the second touch trace is electrically connected with the second touch electrode, the third touch trace is electrically connected with the third touch electrode, and the fourth touch trace is electrically connected with the fourth touch electrode; when the third touch electrode and the fourth touch electrode are transparent electrodes, the first touch trace and the second touch trace include: a trace part and a compensating part, wherein a width of the compensating part is greater than a width of the trace part; the width of the trace part is greater than or equal to a width of the first touch trace and the second touch trace.

In some possible implementations, it further includes: a filter structure layer located at one side of the touch structure layer away from the display structure layer, wherein the filter structure layer includes a filter layer and a black matrix layer; the light emitting structure layer further includes: a pixel defining layer; an orthographic projection of the filter layer on the base substrate is at least partially overlapped with an orthographic projection of the light emitting layer of the light emitting element on the base substrate, and an orthographic projection of the black matrix layer on the base substrate is at least partially overlapped with an orthographic projection of the pixel defining layer on the base substrate; and an orthographic projection of the black matrix layer on the base substrate is at least partially overlapped with an orthographic projection of the metal touch electrode and/or the metal touch connecting part on the base substrate.

In some possible implementations, it further includes: an encapsulating layer and an adhesive layer disposed between the display structure layer and the touch structure layer; the encapsulating layer includes: a first inorganic encapsulating layer, a second organic encapsulating layer, and a third inorganic encapsulating layer which are sequentially stacked on the display structure layer; the encapsulating layer is located at one side of the adhesive layer close to the base substrate, and an orthographic projection of it on the base substrate covers the pixel island and a region between adjacent pixel islands; and the adhesive layer includes: an optical transparent adhesive.

In some possible implementations, when the second touch assembly includes a transparent touch electrode and/or a transparent touch connecting part, the transparent touch electrode and the transparent touch connecting part are made by a low temperature sputtering process.

In some possible implementations, a sub-pixel density of the first display region is greater than a sub-pixel density of the second display region.

In some possible implementations, the first display region includes: a normal display region and a transition display region, wherein the normal display region is surrounded at at least one side of the transition display region, the transition display region is surrounded at at least one side of the second display region, and a light emitting element in the second display region is electrically connected with a pixel circuit in the transition display region; a sub-pixel density of the normal display region is greater than a sub-pixel density of the transition display region, and the sub-pixel density of the transition display region is greater than the sub-pixel density of the second display region.

In some possible implementations, an area of the first sub-pixel is greater than an area of the second sub-pixel.

In a second aspect, the present disclosure also provides a touch display apparatus, which includes: the above touch display substrate and a photosensitive sensor, wherein an orthographic projection of the photosensitive sensor on the base substrate is at least partially overlapped with the second display region.

Other aspects may be understood upon reading and understanding the drawings and detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
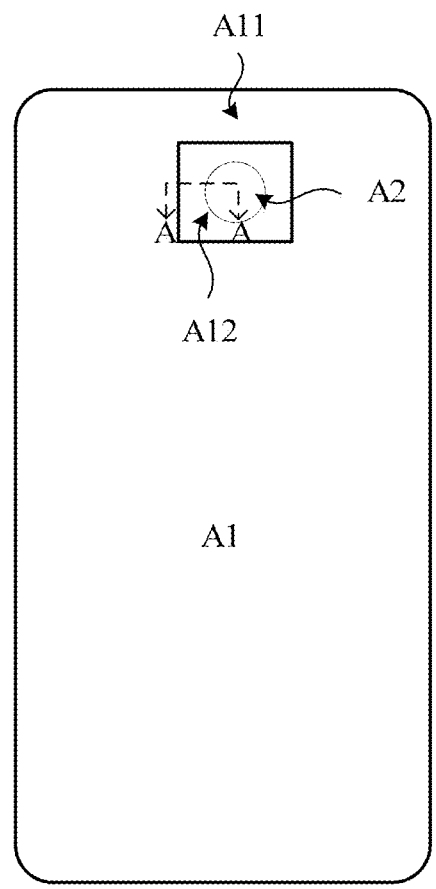
FIG. 1 is a schematic diagram of a region division of a touch display substrate.

To make objectives, technical solutions, and advantages of the present disclosure clearer, the embodiments of the present disclosure will be described in detail with reference to the accompanying drawings. It is to be noted that implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in the actual process, but are not limited thereto. For example, the width-length ratio of the channel, the thickness and spacing of each film layer, and the width and spacing of each signal line may be adjusted according to actual needs. A quantity of pixel units in a display substrate and a quantity of sub-pixels in each pixel unit are not limited to quantities shown in the drawings. The drawings described in the present disclosure are schematic diagrams of structures only, and one mode of the present disclosure is not limited to shapes, numerical values or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

In this specification, "being disposed in a same layer" is referred to a structure formed by patterning two (or more than two) structures through a same patterning process, and their materials may be same or different. For example, materials of precursor bodies forming multiple structures disposed in a same layer are same, and materials formed finally may be same or different.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

A full-screen mobile phone includes: a light-transmitting display region and a normal display region. At present, the light-transmitting display region of the full-screen mobile phone has no touch function. With an increase of an area occupied by a camera region, the light-transmitting display region without the touch function affects a use of the full-screen mobile phone and reduces a reliability of the full-screen mobile phone.

Figure 2:
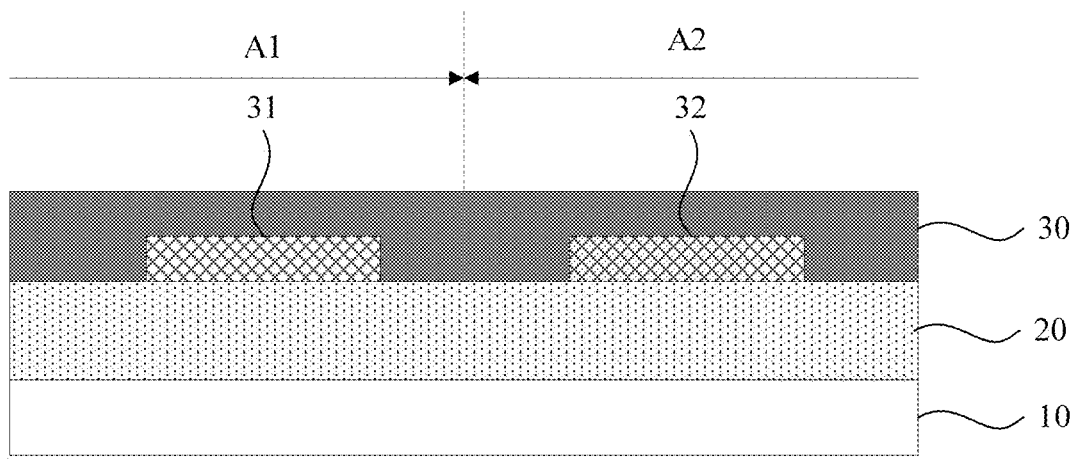
FIG. 2 is a schematic diagram of a structure of a touch display substrate according to an embodiment of the present disclosure.

FIG. 1 is a schematic diagram of a region division of a touch display substrate, and FIG. 2 is a schematic diagram of a structure of a touch display substrate. As shown in FIGS. 1 and 2, the touch display substrate according to the embodiment of the present disclosure includes: a display region and a non-display region, wherein the display region includes a first display region A1 and a second display region A2, the first display region A1 surrounding at least one side of the second display region A2; the touch display substrate includes a base substrate 10 and a display structure layer 20 and a touch structure layer 30 disposed on the base substrate sequentially; the first display region A1 includes a first touch assembly 31, and the second display region A2 includes a second touch assembly 32. The display structure layer includes: multiple pixel circuits located in the first display region and multiple light emitting elements located in the first display region and the second display region.

In the present disclosure, as shown in FIG. 2, the first touch assembly 31 is located in the touch structure layer 30, and the second touch assembly 32 is located in the display structure layer 20 and/or the touch structure layer 30. FIG. 2 takes the second touch assembly 32 being located in the touch structure layer 30 as an illustration.

In an exemplary embodiment, the base substrate 10 may be a flexible base substrate, or may be a rigid base substrate. The rigid base substrate may include, but be not limited to, one or more of glass and quartz. The flexible underlay substrate may be made of, but not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the flexible base substrate may include a first flexible material layer, a first inorganic material layer, a semiconductor layer, a second flexible material layer, and a second inorganic material layer which are stacked. Materials of the first flexible material layer and the second flexible material layer may be made of polyimide (PI), polyethylene terephthalate (PET), or a polymer soft film with a surface treatment. Materials of the first inorganic material layer and the second inorganic material layer may be silicon nitride (SiNx) or silicon oxide (SiOx), etc., for improving water-resistance and oxygen-resistance capabilities of the base substrate, and a material of the semiconductor layer may be amorphous silicon (a-si).

In an exemplary embodiment, the pixel circuit may be a structure of 3T1C 4T1C, 5T1C, 5T2C, 6T1C, 7T1C, or 8T1C, which is not limited by the present disclosure.

In an exemplary embodiment, the light emitting device may be an organic electroluminescent diode (OLED) or a quantum dot light emitting diode (QLED), wherein the OLED includes a first electrode (anode), a light emitting layer, and a second electrode (cathode) which are stacked. The anode is connected with the pixel circuit, the light emitting layer is connected with the anode, the cathode is connected with the light emitting layer, and the light emitting layer emits light of a corresponding color under driving of the anode and the cathode.

In an exemplary embodiment, the light emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked.

In an exemplary embodiment, hole injection layers of all sub-pixels may be connected together to form a common layer, electron injection layers of all the sub-pixels may be connected together to form a common layer, hole transport layers of all the sub-pixels may be connected together to form a common layer, electron transport layers of all the sub-pixels may be connected together to form a common layer, hole block layers of all the sub-pixels may be connected together to form a common layer, emitting layers of adjacent sub-pixels may be overlapped slightly, or may be isolated from each other, and electron block layers of adjacent sub-pixels may be overlapped slightly, or may be isolated from each other.

In an exemplary embodiment, the anode may be made of a transparent conductive material, for example, Indium Tin Oxide (ITO) or Indium Zinc Oxide (IZO). A shape of the light emitting element may be any one or more of a triangle, a square, a rectangle, a diamond, a trapezoid, a parallelogram, a pentagon, a hexagon, and other polygons, which is not limited in the present disclosure here.

In an exemplary embodiment, the cathode may adopt any one or more of magnesium (Mg), silver (Ag), aluminum (Al), copper (Cu), and lithium (Li), or an alloy made of any one or more of the above metals.

In an exemplary embodiment, the second display region A2 may be a light-transmitting display region. The light-transmitting display region may display or transmit light.

In an exemplary embodiment, in a plane parallel to a display panel, a shape of the second display region may be any one or more of the following: a rectangle, a polygon, a circle, and an ellipse. FIG. 1 takes the circle as an example for illustration. For example, when a shape of the second display region is a circle, a diameter of the circle may be about 3 mm to 5 mm. For another example, when the shape of the second display region is a rectangle, a side length of the rectangle may be about 3 mm to 5 mm.

In an exemplary embodiment, in a plane parallel to the display panel, a shape of the first display region A1 may be any one or more of the following: a rectangle, a polygon, a circle, and an ellipse.

In an exemplary embodiment, an area of the first display region A1 may be greater than an area of the second display region A2, or an area of the first display region A1 may be equal to an area of the second display region A2, or an area of the first display region A1 may be smaller than an area of the second display region A2. FIG. 1 takes an area of the first display region being greater than an area of the second display region as an example for illustration.

In an exemplary embodiment, shape of the display region may be a rounded polygon or a circle. When the shape of the display region is a rounded polygon, the display region may also include: a straight line display boundary. FIG. 1 takes the display region being a rounded rectangle as an example for illustration.

In an exemplary embodiment, the display region may include: a data signal line, a scan signal line, and a light emitting signal line connected with the pixel circuit. The non-display region may include: a timing controller, a data drive circuit, a scan drive circuit, and a light emitting drive circuit.

In an exemplary embodiment, the timing controller may provide a gray-scale value and a control signal suitable for a specification of the data drive circuit to the data drive circuit, provide a clock signal, a scan start signal, etc., suitable for a specification of the scan drive circuit to the scan drive circuit, and provide a clock signal, an emission stop signal, etc., suitable for a specification of the light emitting drive circuit to the light emitting drive circuit.

In an exemplary embodiment, the data drive circuit may generate a data voltage to be provided to the data signal line using a gray-scale value and a control signal received from the timing controller. For example, the data drive circuit may sample the gray-scale value using a clock signal, and apply a data voltage corresponding to the gray-scale value to the data signal line by taking a pixel row as a unit.

In an exemplary embodiment, the scan drive circuit may generate a scan signal to be provided to the scan signal line by receiving a clock signal, a scan start signal, or the like, from the timing controller. For example, the scan drive circuit may sequentially provide scan signals with on-level pulses to the scan signal line. The scan drive circuit may be constructed in a form of a shift register, and may generate a scan signal by sequentially transmitting scan start signals provided in a form of an on-level pulse to a next stage circuit under controlling of the clock signal.

In an exemplary embodiment, the light emitting drive circuit may generate an emitting signal to be provided to the light emitting signal line by receiving the clock signal, the emitting stop signal, and the like from the timing controller. The light emitting drive circuit may sequentially provide emitting signals with off-level pulses to the light emitting signal line. For example, the light emitting drive circuit may be constructed in a form of a shift register, and may generate a light emitting signal by sequentially transmitting light emitting stop signals provided in a form of an off-level pulse to a next stage circuit under controlling of the clock signal.

A touch display substrate according to an embodiment of the present disclosure includes: a display region and a non-display region, wherein the display region includes a first display region and a second display region, the first display region surrounding at least one side of the second display region; the touch display substrate includes a base substrate and a display structure layer and a touch structure layer disposed on the base substrate sequentially; the first display region includes a first touch assembly, and the second display region includes a second touch assembly; the display structure layer includes multiple pixel circuits located in the first display region and multiple light emitting elements located in the first display region and the second display region; the first touch assembly is located in the touch structure layer, and the second touch assembly is located in the display structure layer and/or the touch structure layer.

The present disclosure achieves a touch function of the second display region by disposing the second touch assembly in the second display region, and improves a reliability of the touch display substrate.

In an exemplary embodiment, the light emitting element includes: a first light emitting element disposed in the first display region and a second light emitting element disposed in the second display region. An area of the first light emitting element may be greater than an area of the second light emitting element.

In an exemplary embodiment, the display structure layer may include: multiple first sub-pixels located in the first display region and multiple second sub-pixels located in the second display region. A first sub-pixel includes a first pixel circuit and a first light emitting element connected with the first pixel circuit, and the second sub-pixel includes a second light emitting element. The first pixel circuit is disposed in the first display region.

In an exemplary embodiment, multiple sub-pixels constitute one pixel island. A distance between adjacent pixel islands is greater than a distance between adjacent second sub-pixels located in a same pixel island.

In an exemplary embodiment, a shape of the pixel island may be a square or a circle.

In an exemplary embodiment, the display structure layer may also include an anode connecting line, and a pixel circuit includes a second pixel circuit disposed in the first display region, wherein the second pixel circuit is connected with the second light emitting element through the anode connecting line.

In an exemplary embodiment, the anode connecting line includes a transparent wire. Exemplarily, a manufacturing material of the transparent wire may adopt indium tin oxide (ITO) or indium zinc oxide (IZO).

In an exemplary embodiment, the second sub-pixel may also include: a second pixel circuit connected with the second light emitting element. The second pixel circuit is disposed in the second display region, and an orthographic projection of the second pixel circuit on the base substrate is overlapped with an orthographic projection of the pixel island on the base substrate.

In an exemplary embodiment, an area of the second sub-pixel may be less than an area of the first sub-pixel, which is not limited by the present disclosure.

In an exemplary embodiment, a shape of the first sub-pixel and the second sub-pixel may be any one or more of a triangle, a square, a rectangle, a rhombus, a trapezoid, a parallelogram, a pentagon, a hexagon, and other polygons, and sub-pixels may be arranged in an X-shape, a cross shape, or a T shape, etc., which are not limited in the present disclosure here.

In an exemplary embodiment, shapes of the first sub-pixel and the second sub-pixel may be same or may be different, which is not limited by the present disclosure.

In an exemplary embodiment, a sub-pixel density of the first display region is greater than a sub-pixel density of the second display region, i.e. a resolution (Pixels Per Inch) of the first display region is greater than a resolution of the second display region. Pixels Per Inch (PPI) refers to a quantity of sub-pixels owned per unit area, which may be called a sub-pixel density.

The higher the PPI numerical value, the higher the density of a picture is displayed, and details of the picture are rich. A resolution of the second display region is smaller than a resolution of the first display region, i.e. a quantity of light emitting elements included in the second display region within a unit area is smaller than a quantity of light emitting elements included in the first display region.

In an exemplary embodiment, as shown in FIG. 1, the first display region A1 includes a normal display region A11 and a transition display region A12; the normal display region A11 surrounds at least one side of the transition display region A12, the transition display region A12 surrounds at least one side of the second display region A2, and a light emitting element in the second display region A2 is electrically connected with a pixel circuit in the transition display region A12.

In an exemplary embodiment, a sub-pixel density of the normal display region may be greater than a sub-pixel density of the transition display region, i.e. a resolution of the normal display region is greater than a resolution of the transition display region.

In an exemplary embodiment, the sub-pixel density of the transition display region may be greater than the sub-pixel density of the second display region, i.e. the resolution of the transition display region is greater than the resolution of the second display region.

In an exemplary embodiment, in a plane parallel to the display panel, the touch display substrate may include multiple pixel units in a regular arrangement. Each pixel unit may include 3 sub-pixels, or may include 4 sub-pixels, or may include multiple sub-pixels. When the pixel unit includes three sub-pixels, the three sub-pixels include a first sub-pixel emitting light of a first color, a second sub-pixel emitting light of a second color, and a third sub-pixel emitting light of a third color. When the pixel unit includes four sub-pixels, the four sub-pixels include a first sub-pixel emitting light of a first color, a second sub-pixel emitting light of a second color, a third sub-pixel emitting light of a third color, and a fourth sub-pixel emitting light of a fourth color. Shapes of the four sub-pixels are all squares, which are arranged in a Square mode.

In an exemplary embodiment, the pixel unit may include a red sub-pixel R, a green sub-pixel G, a blue sub-pixel B, a cyan sub-pixel, a magenta sub-pixel, a yellow sub-pixel, and a white sub-pixel.

In an exemplary embodiment, when the pixel unit includes three sub-pixels, three rectangular sub-pixels may be arranged in parallel in a horizontal direction, or in a vertical direction.

In an exemplary embodiment, when the pixel unit includes four sub-pixels, the four sub-pixels included in the pixel unit may adopt various shapes and be arranged in various modes. The four sub-pixels may adopt a rectangle and be arranged in parallel, and are an R sub-pixel, a G sub-pixel, a B sub-pixel, and a G sub-pixel from left to right respectively; or the four sub-pixels may adopt pentagons and hexagons respectively, and arranged in parallel, wherein two pentagonal G sub-pixels are located in the middle of the pixel unit, and a hexagonal R sub-pixel and a hexagonal B sub-pixel are located at two sides of the G sub-pixels respectively.

Figure 3:
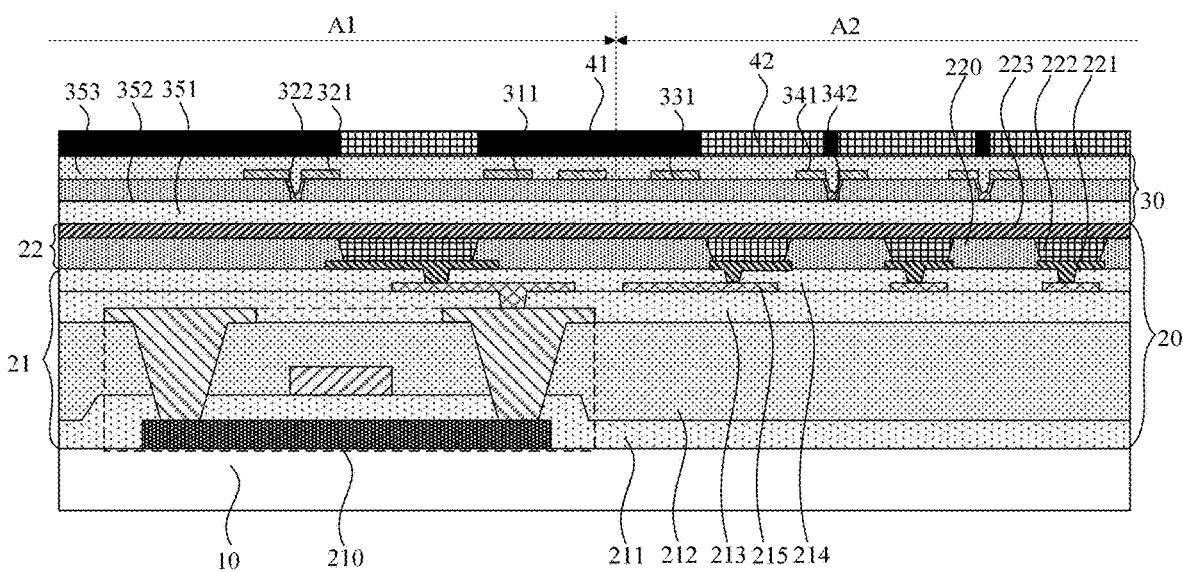
FIG. 3 is a first cross-sectional schematic diagram of a touch display substrate along an A-A direction according to an exemplary embodiment.
Figure 4:
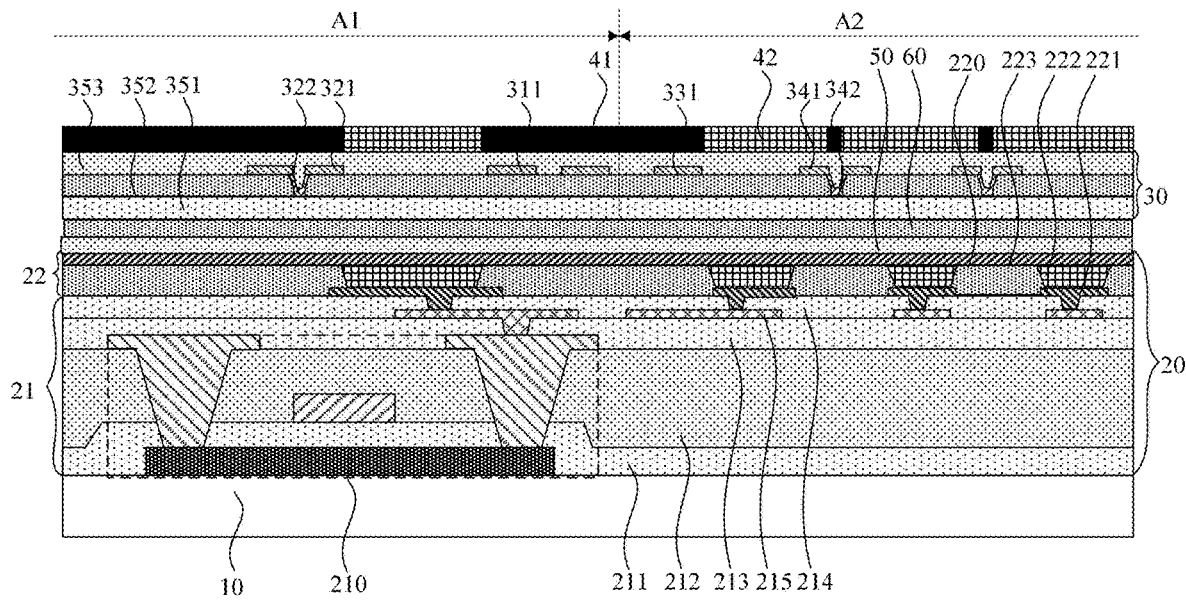
FIG. 4 is a second cross-sectional schematic diagram of a touch display substrate along an A-A direction according to an exemplary embodiment.
Figure 5:
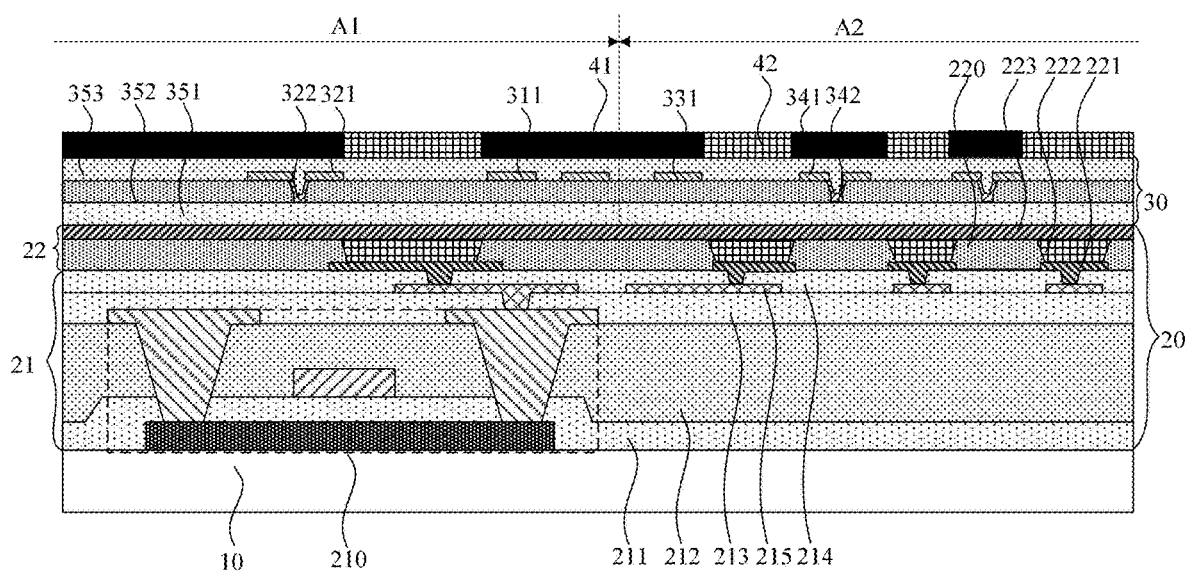
FIG. 5 is a third cross-sectional schematic diagram of a touch display substrate along an A-A direction according to an exemplary embodiment.
Figure 6:
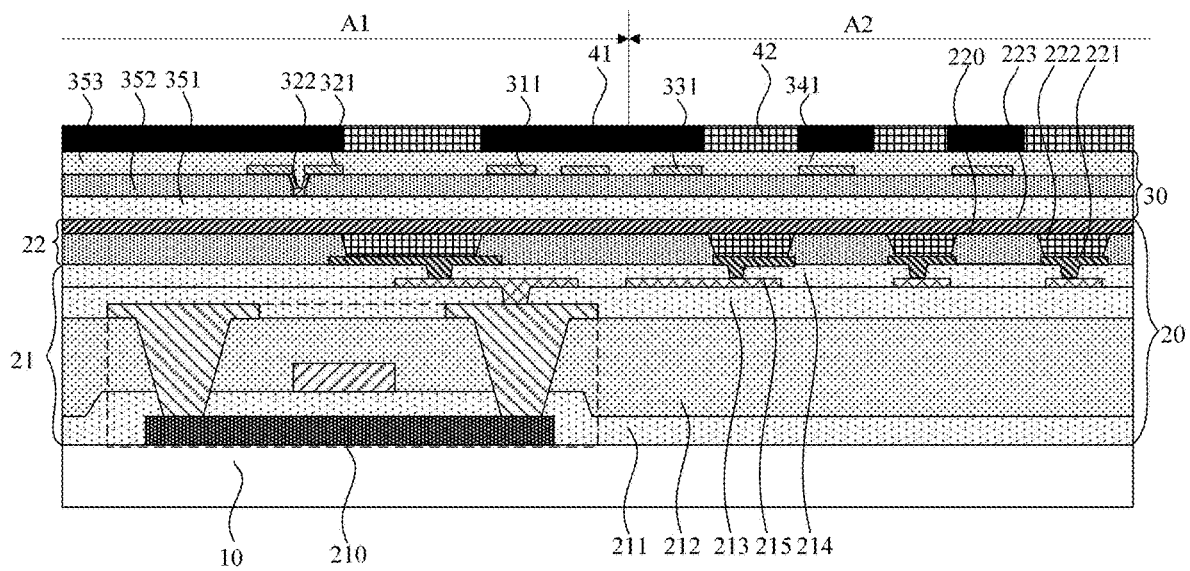
FIG. 6 is a fourth cross-sectional schematic diagram of a touch display substrate along an A-A direction according to an exemplary embodiment.
Figure 7:
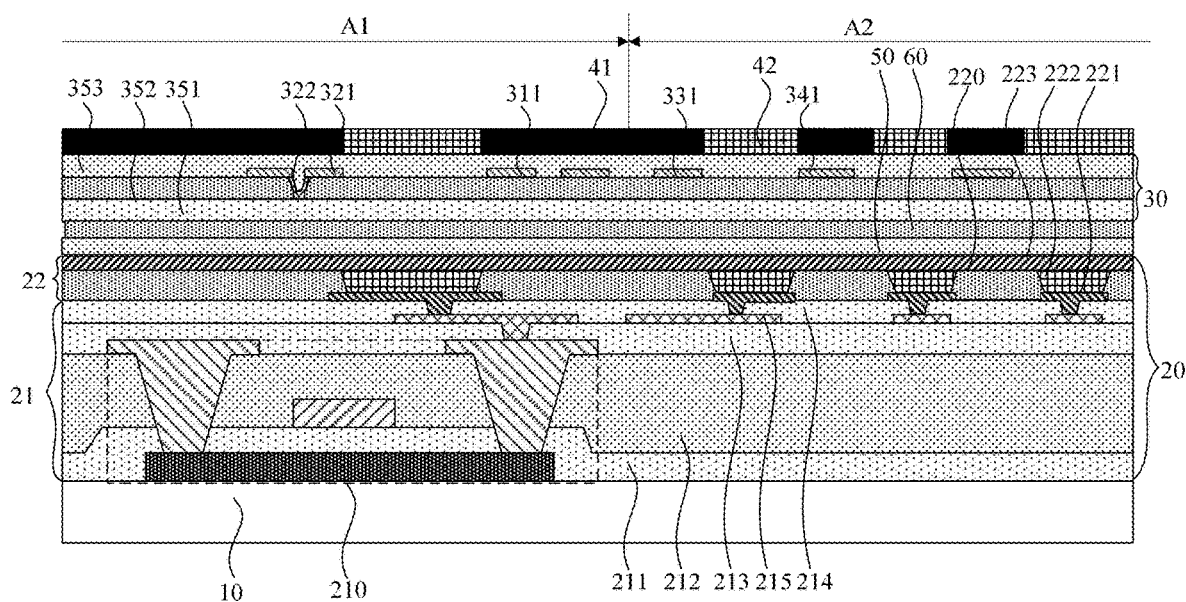
FIG. 7 is a fifth cross-sectional schematic diagram of a touch display substrate along an A-A direction according to an exemplary embodiment.
Figure 8:
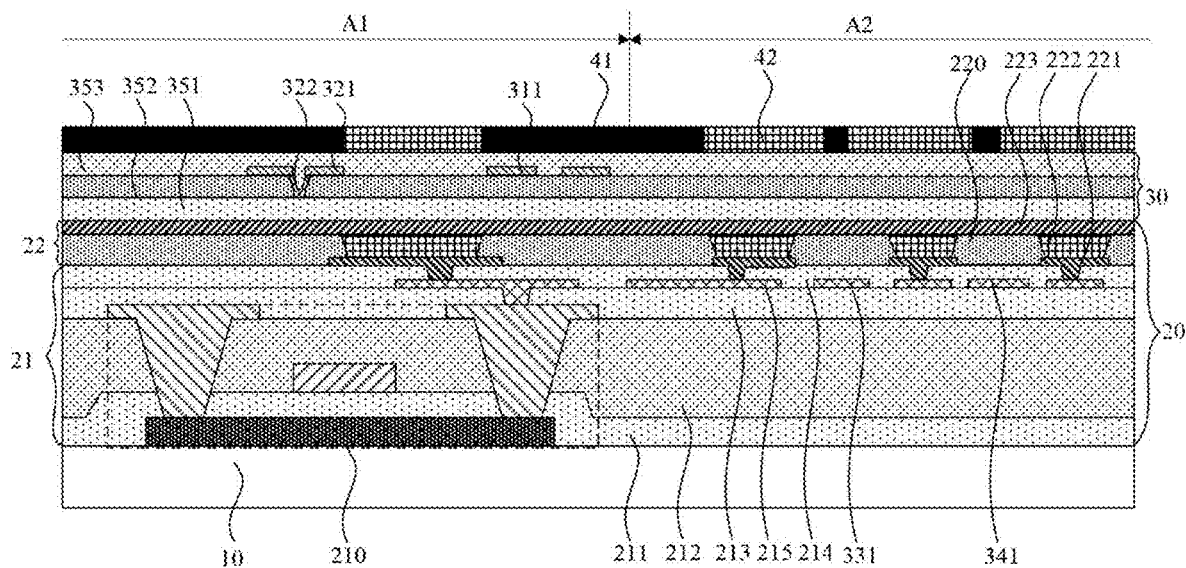
FIG. 8 is a sixth cross-sectional schematic diagram of a touch display substrate along an A-A direction according to an exemplary embodiment.
Figure 9:
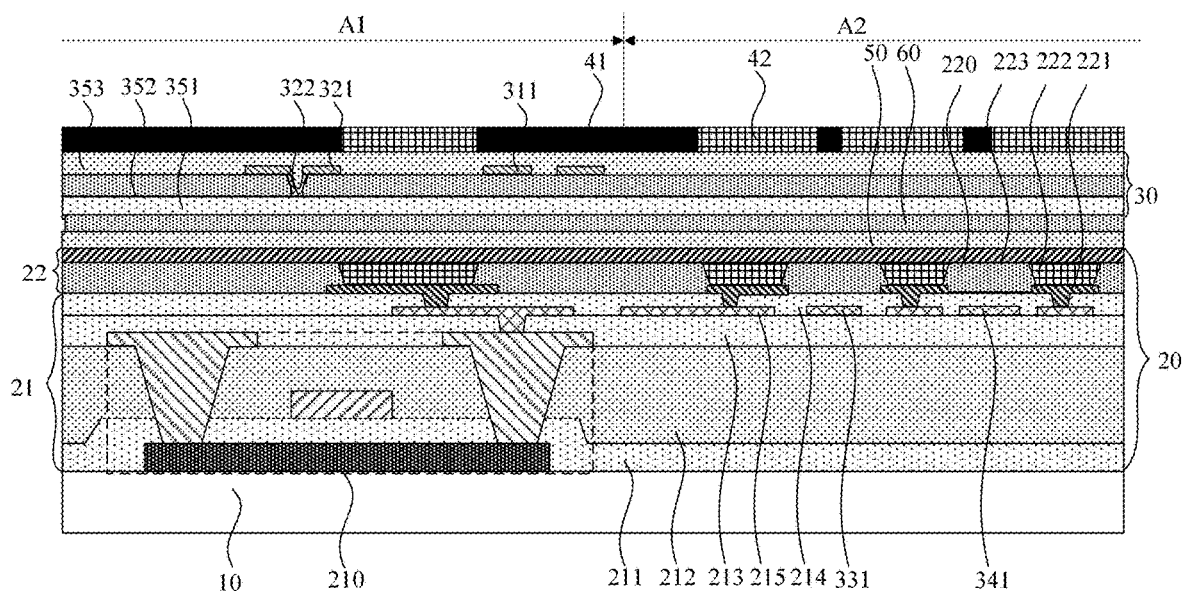
FIG. 9 is a seventh cross-sectional schematic diagram of a touch display substrate along an A-A direction according to an exemplary embodiment.
Figure 10:
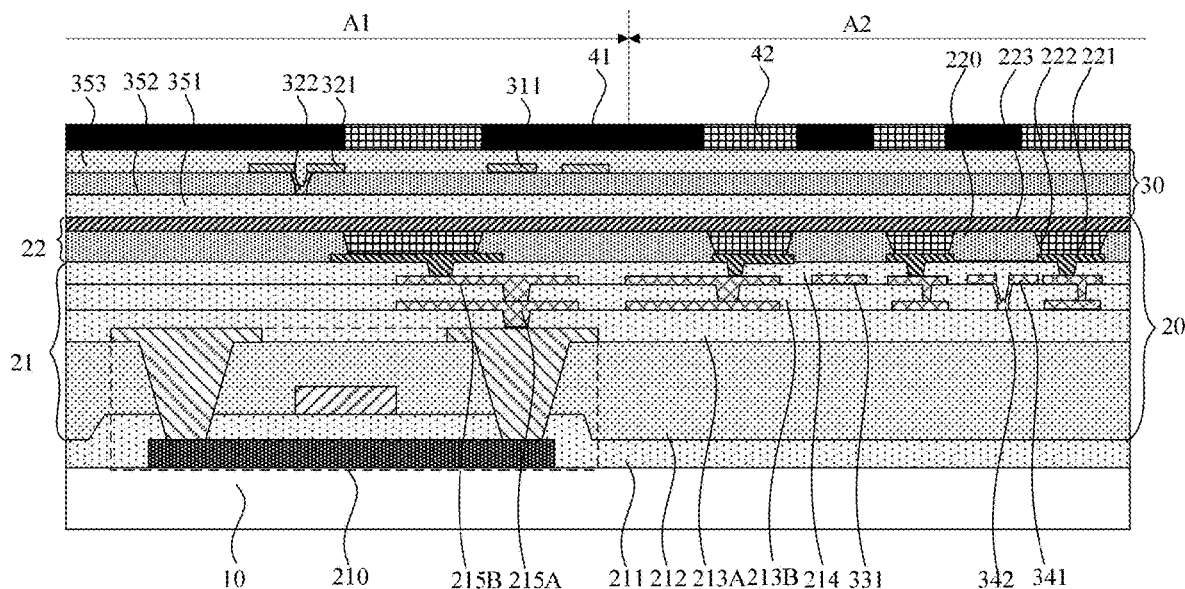
FIG. 10 is an eighth cross-sectional schematic diagram of a touch display substrate along an A-A direction according to an exemplary embodiment.
Figure 11:
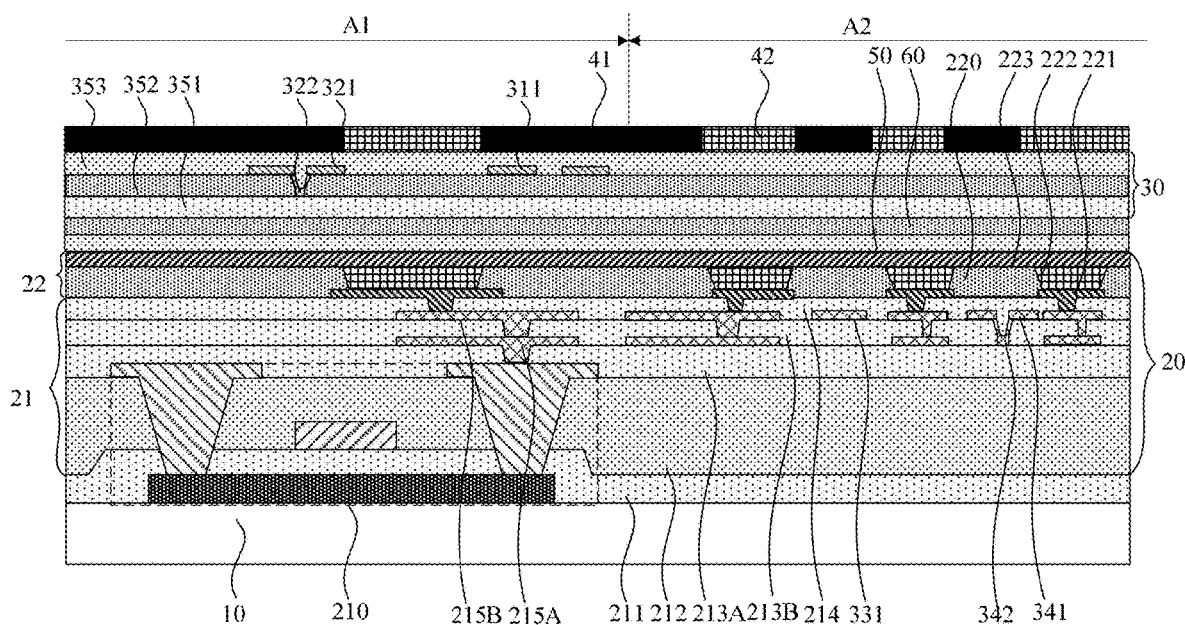
FIG. 11 is a ninth cross-sectional schematic diagram of a touch display substrate along an A-A direction according to an exemplary embodiment.
Figure 12:
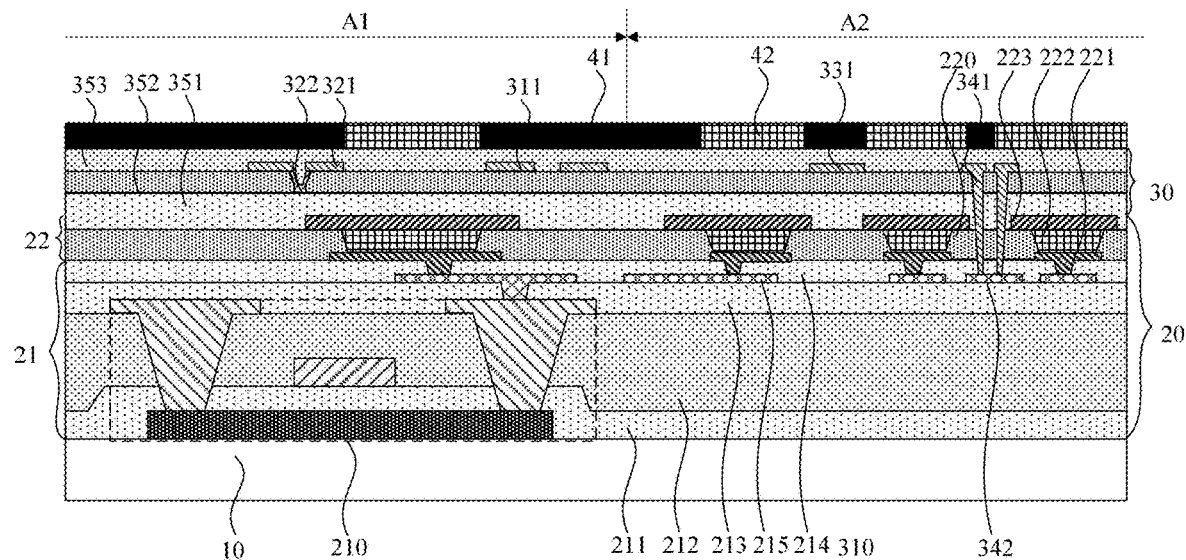
FIG. 12 is a tenth cross-sectional schematic diagram of a touch display substrate along an A-A direction according to an exemplary embodiment.
Figure 13:
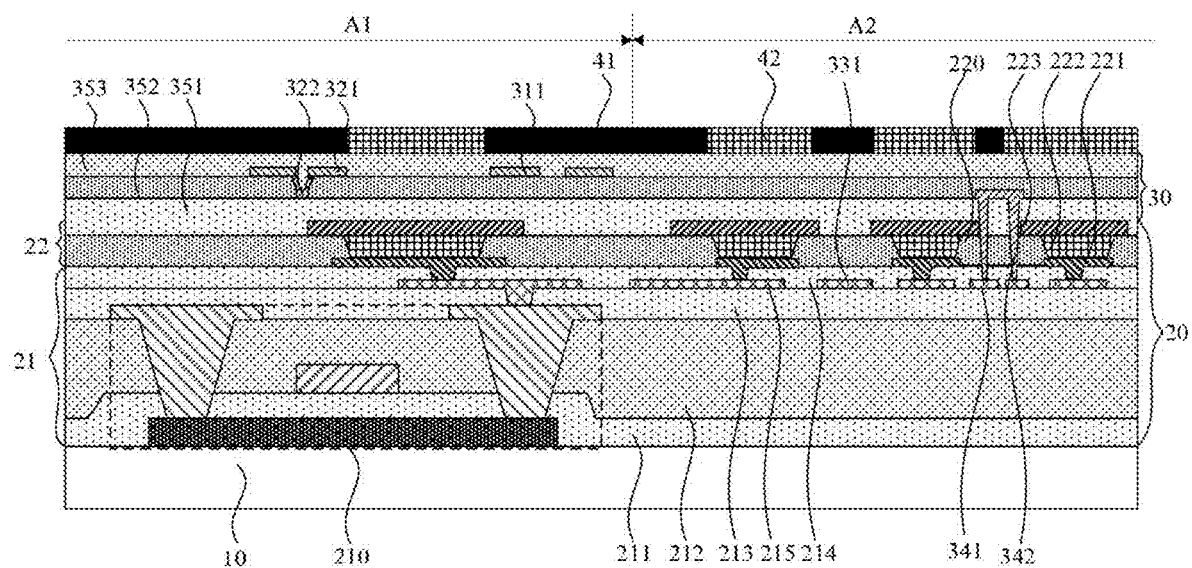
FIG. 13 is an eleventh cross-sectional schematic diagram of a touch display substrate along an A-A direction according to an exemplary embodiment.
Figure 14:
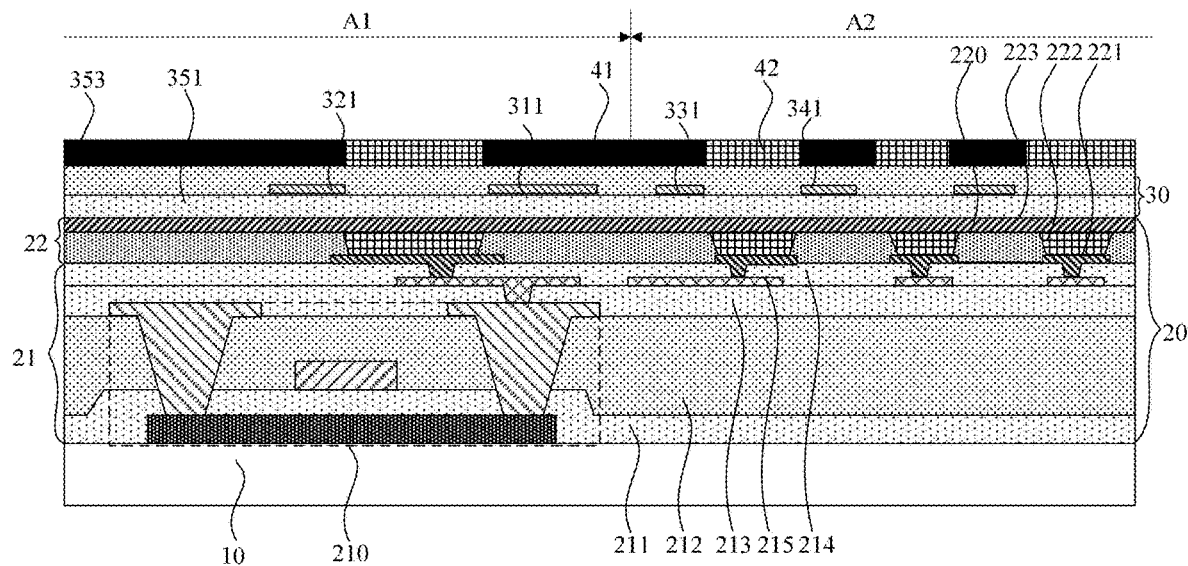
FIG. 14 is a twelfth cross-sectional schematic diagram of a touch display substrate along an A-A direction according to an exemplary embodiment.
Figure 15:
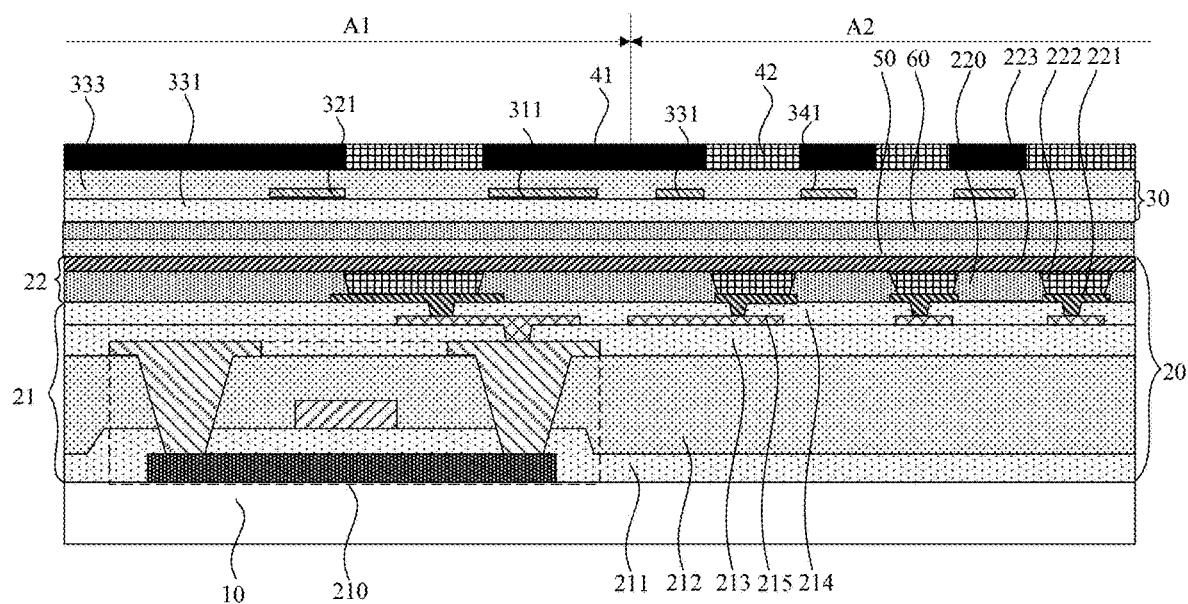
FIG. 15 is a thirteenth cross-sectional schematic diagram of a touch display substrate along an A-A direction according to an exemplary embodiment.
Figure 16:
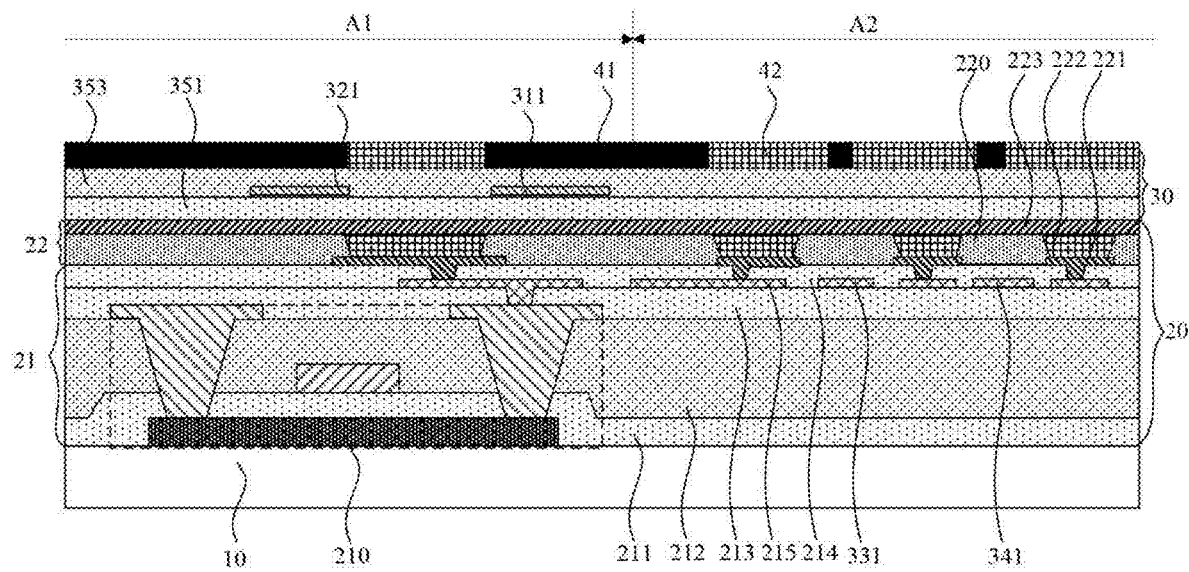
FIG. 16 is a fourth cross-sectional schematic diagram of a touch display substrate along an A-A direction according to an exemplary embodiment.
Figure 17:
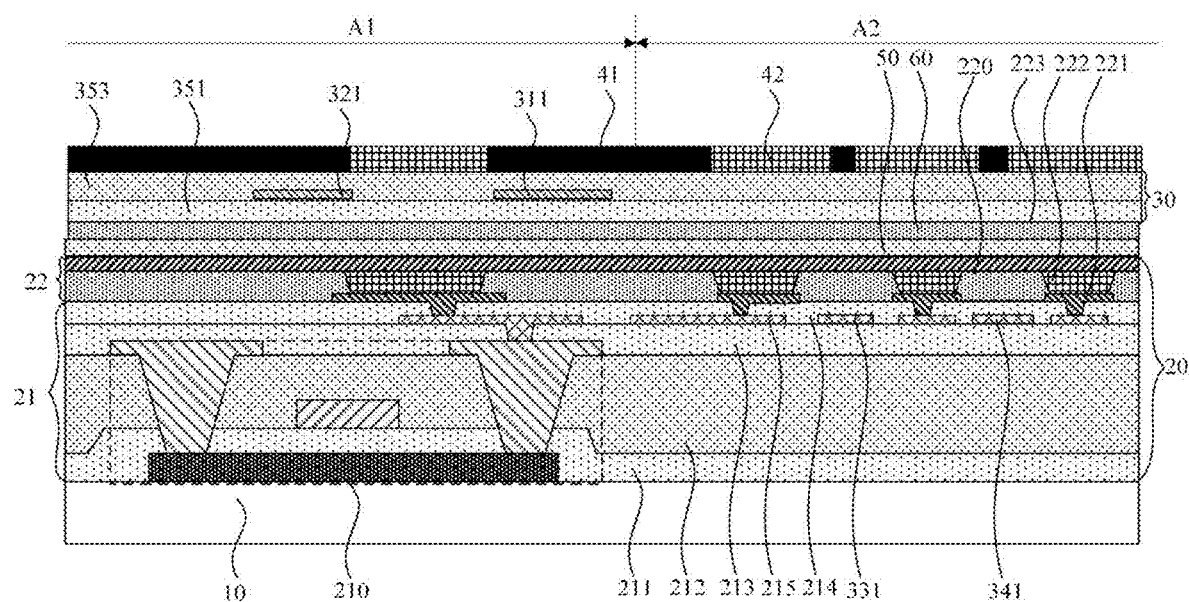
FIG. 17 is a fifth cross-sectional schematic diagram of a touch display substrate along an A-A direction according to an exemplary embodiment.
Figure 18:
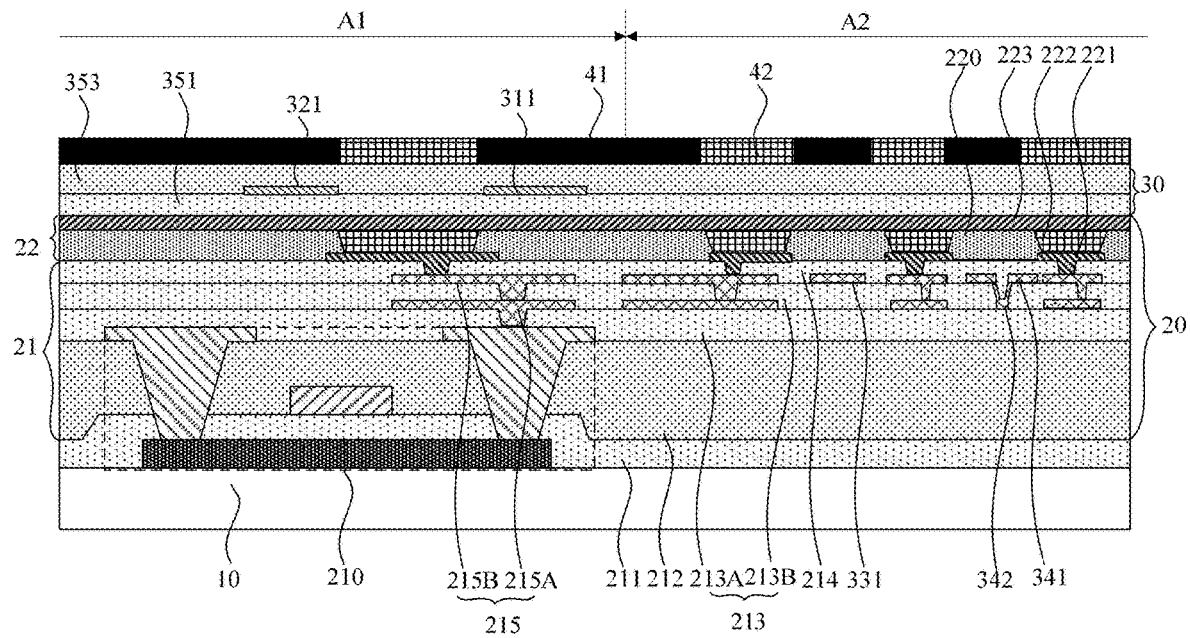
FIG. 18 is a sixth cross-sectional schematic diagram of a touch display substrate along an A-A direction according to an exemplary embodiment.
Figure 19:
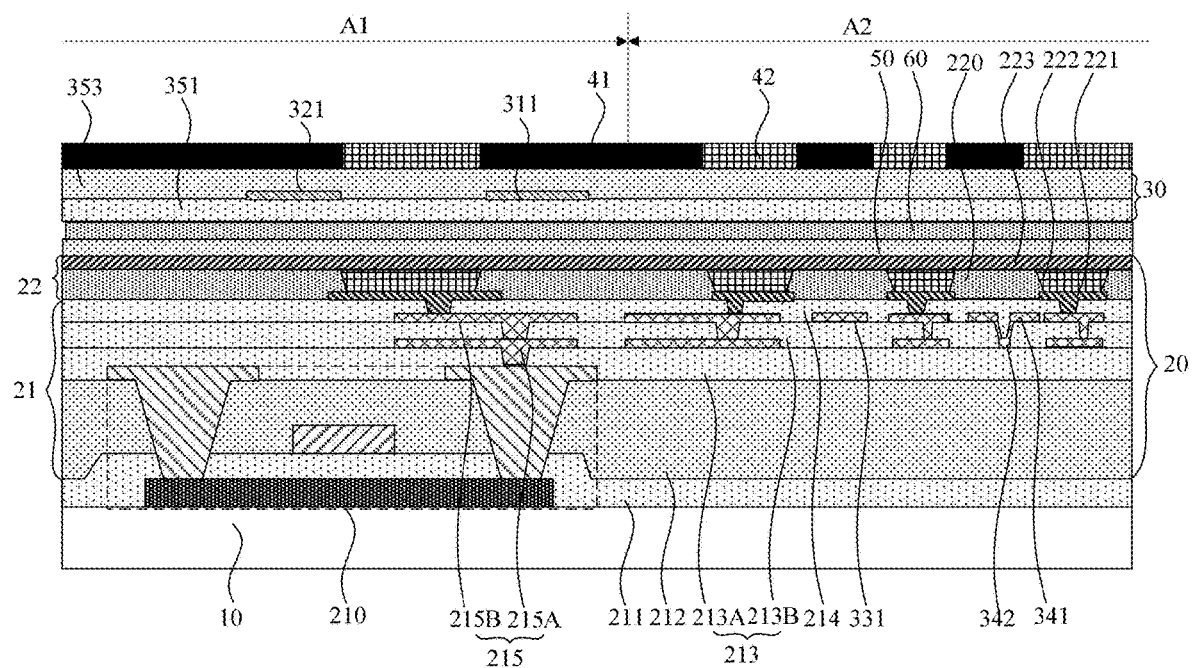
FIG. 19 is a seventh cross-sectional schematic diagram of a touch display substrate along an A-A direction according to an exemplary embodiment.
Figure 20:
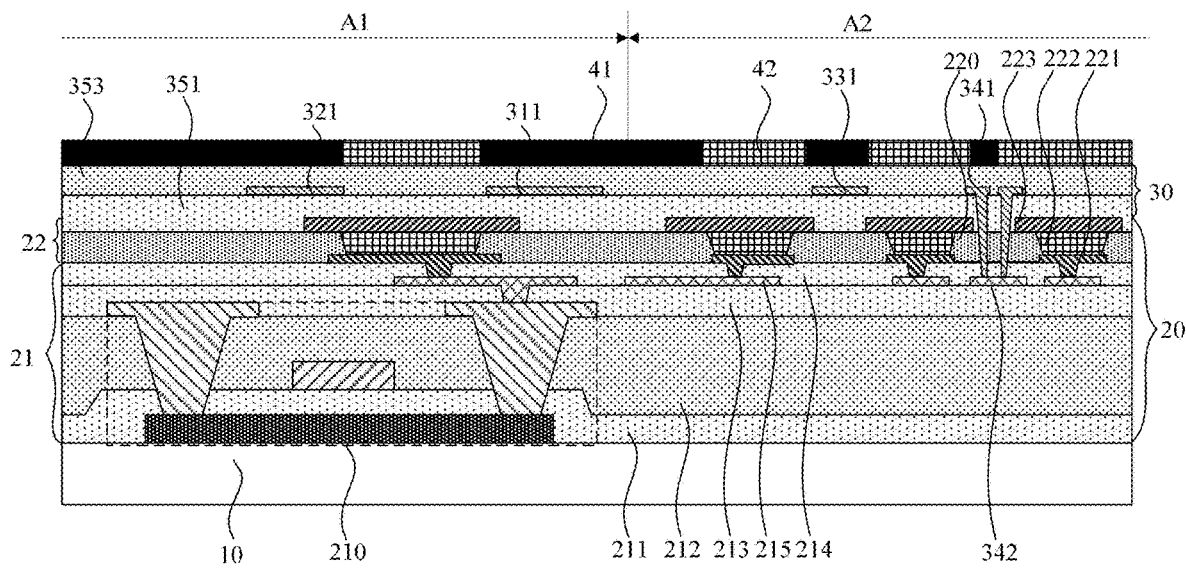
FIG. 20 is an eighteenth cross-sectional schematic diagram of a touch display substrate along an A-A direction according to an exemplary embodiment.
Figure 21:
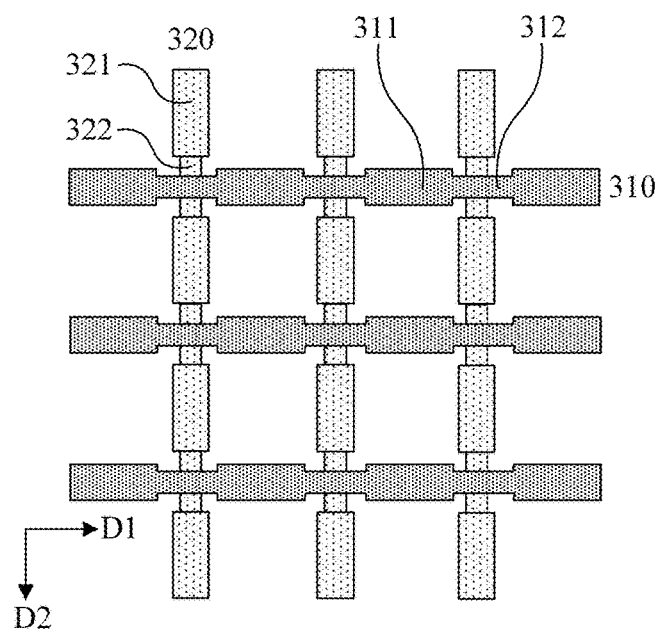
FIG. 21 is a first top view of a first touch assembly according to an exemplary embodiment.
Figure 22:
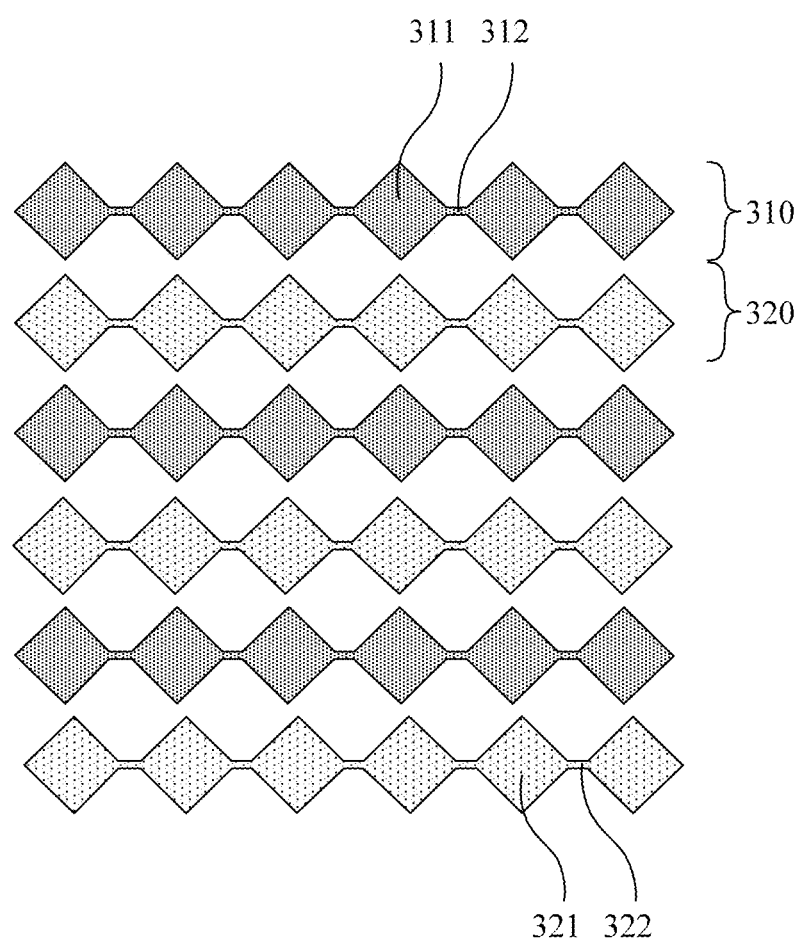
FIG. 22 is a second top view of a first touch assembly according to an exemplary embodiment.
Figure 23:
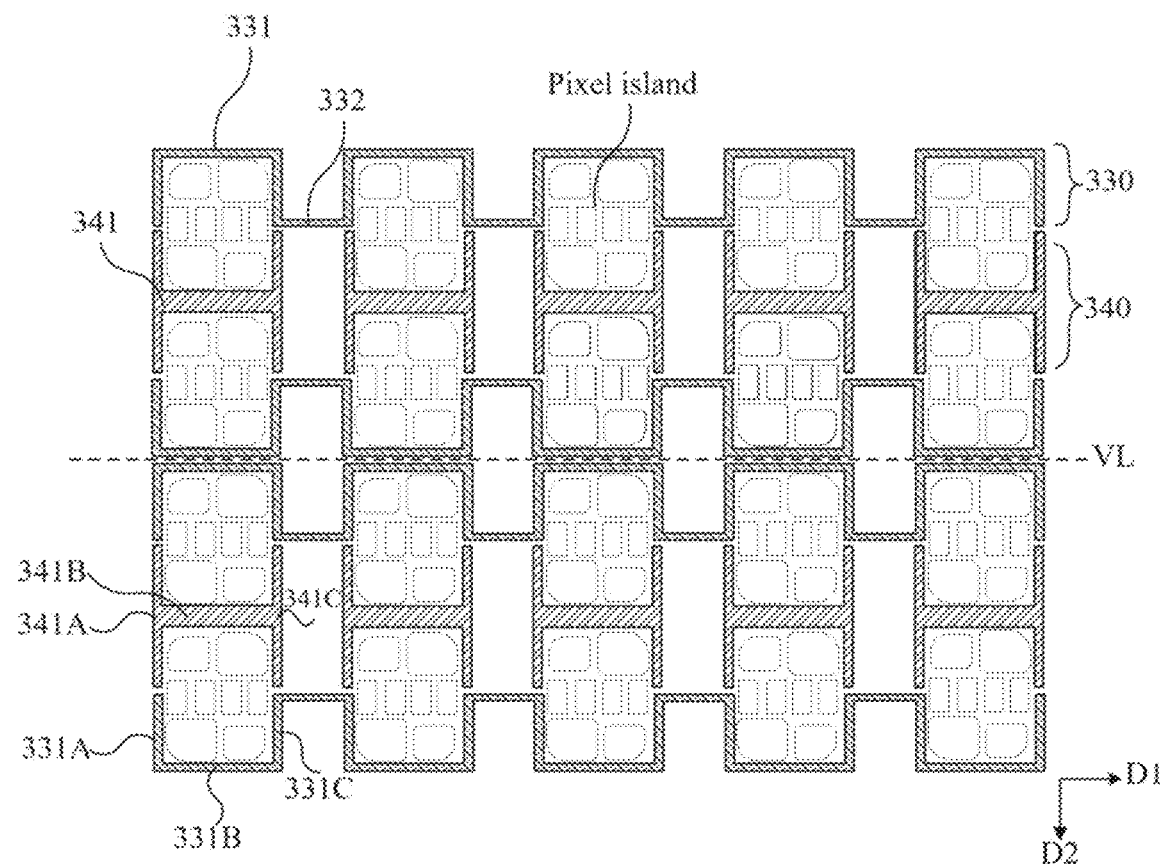
FIG. 23 is a first top view of a second touch assembly according to an exemplary embodiment.
Figure 24:
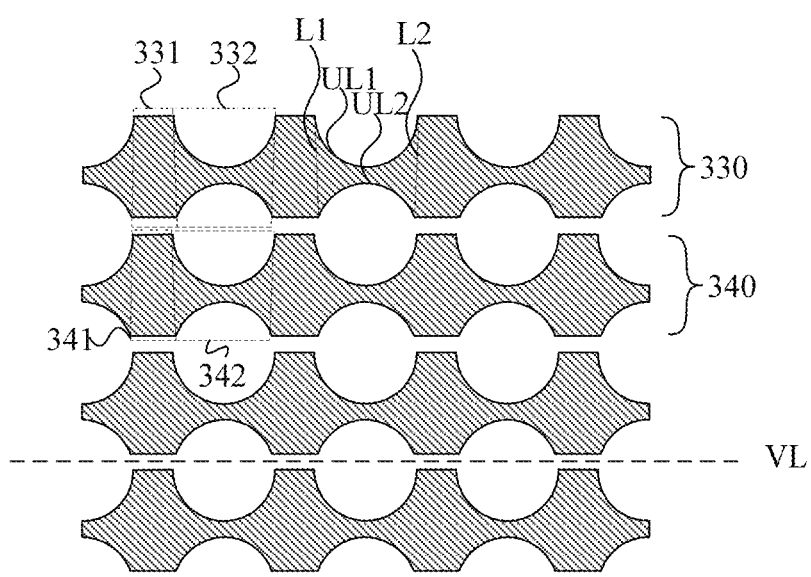
FIG. 24 is a second top view of a second touch assembly according to an exemplary embodiment.
Figure 25:
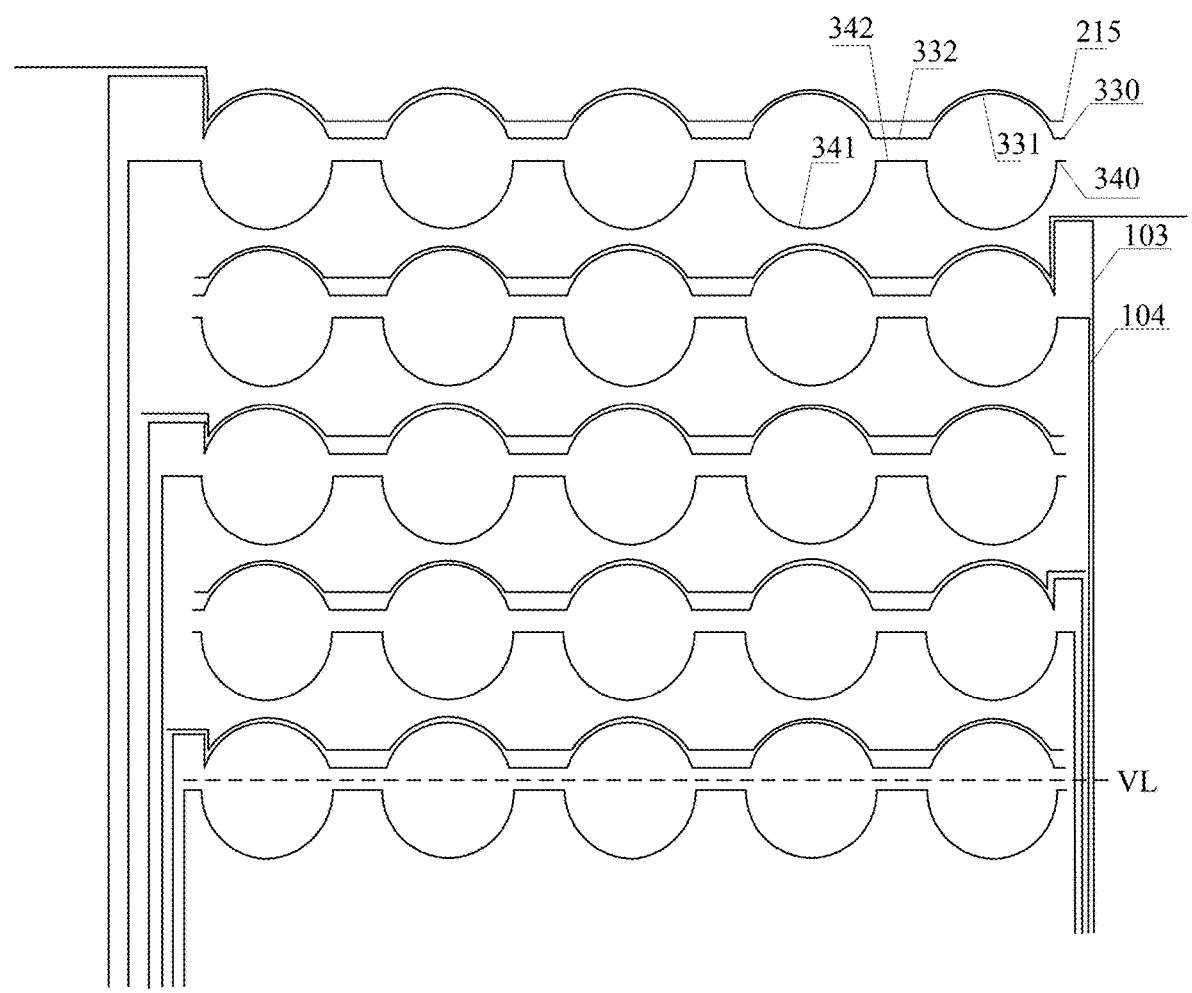
FIG. 25 is a third top view of a second touch assembly according to an exemplary embodiment.
Figure 26:
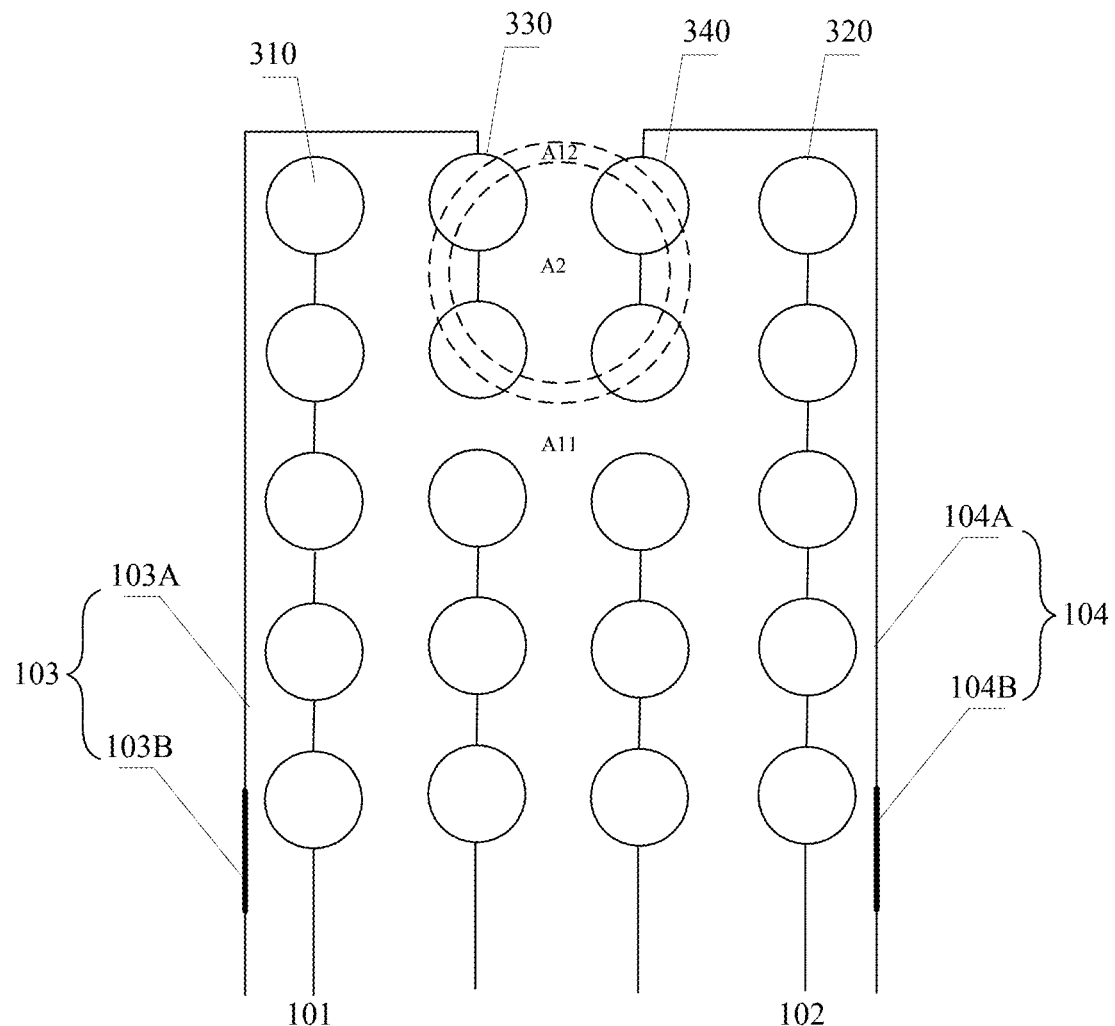
FIG. 26 is a schematic diagram of a structure of a touch display substrate according to another exemplary embodiment.

FIG. 3 is a first cross-sectional schematic diagram of a touch display substrate along an A-A direction according to an exemplary embodiment, FIG. 4 is a second cross-sectional schematic diagram of a touch display substrate along an A-A direction according to an exemplary embodiment, FIG. 5 is a third cross-sectional schematic diagram of a touch display substrate along an A-A direction according to an exemplary embodiment, FIG. 6 is a fourth cross-sectional schematic diagram of a touch display substrate along an A-A direction according to an exemplary embodiment, FIG. 7 is a fifth cross-sectional schematic diagram of a touch display substrate along an A-A direction according to an exemplary embodiment, FIG. 8 is a sixth cross-sectional schematic diagram of a touch display substrate along an A-A direction according to an exemplary embodiment, FIG. 9 is a seventh cross-sectional schematic diagram of a touch display substrate along an A-A direction according to an exemplary embodiment, FIG. 10 is an eighth cross-sectional schematic diagram of a touch display substrate along an A-A direction according to an exemplary embodiment, FIG. 11 is a ninth cross-sectional schematic diagram of a touch display substrate along the A-A direction according to an exemplary embodiment, FIG. 12 is a tenth cross-sectional schematic diagram of a touch display substrate along an A-A direction according to an exemplary embodiment, FIG. 13 is an eleventh cross-sectional schematic diagram of a touch display substrate along an A-A direction according to an exemplary embodiment, FIG. 14 is a twelfth cross-sectional schematic diagram of a touch display substrate along an A-A direction according to an exemplary embodiment, FIG. 15 is a thirteenth cross-sectional schematic diagram of a touch display substrate along an A-A direction according to an exemplary embodiment, FIG. 16 is a fourteenth cross-sectional schematic diagram of a touch display substrate along an A-A direction according to an exemplary embodiment, FIG. 17 is a fifteenth cross-sectional schematic diagram of a touch display substrate along an A-A direction according to an exemplary embodiment, FIG. 18 is a sixteenth cross-sectional schematic diagram of a touch display substrate along an A-A direction according to an exemplary embodiment, FIG. 19 is a seventeenth cross-sectional schematic diagram of a touch display substrate along an A-A direction according to an exemplary embodiment, FIG. 20 is an eighteenth cross-sectional schematic diagram of a touch display substrate along an A-A direction according to an exemplary embodiment, FIG. 21 is a first top view of a first touch assembly according to an exemplary embodiment, FIG. 22 is a second top view of a first touch assembly according to an exemplary embodiment, FIG. 23 is a first top view of a second touch assembly according to an exemplary embodiment, FIG. 24 is a second top view of a second touch assembly according to an exemplary embodiment, FIG. 25 is a third top view of a second touch assembly according to an exemplary embodiment, and FIG. 26 is a schematic diagram of a structure of a touch display substrate according to an exemplary embodiment. FIG. 3 to FIG. 7, FIG. 14, and FIG. 15 take the second touch assembly located in the touch structure layer as an example for illustration, FIG. 8 to FIG. 11, and FIG. 16 to FIG. 19 take the second touch assembly located in the display structure layer as an example for illustration, and FIG. 12, FIG. 13, and FIG. 20 take the second touch assembly located in the display structure layer and the touch structure layer as an example for illustration. As shown in FIGS. 3 to 20, in an exemplary embodiment, the display structure layer 20 may include: a circuit structure layer 21 and a light emitting structure layer 22 which are sequentially stacked on the base substrate 10. The circuit structure layer includes a first pixel circuit and a second pixel circuit, wherein the first pixel circuit and the second pixel circuit include multiple transistors 210. A transistor includes: an active layer, a gate electrode, and source-drain electrodes.

In an exemplary embodiment, as shown in FIGS. 3 to 20, the circuit structure layer includes: an active layer, a first insulating layer 211, a gate electrode, a second insulating layer 212, source-drain electrodes, a first planarization layer 213, an anode connecting line, and a second planarization layer 214 which are sequentially stacked on the base substrate 10.

In an exemplary embodiment, the active layer may adopt a material such as amorphous indium gallium zinc oxide (a-IGZO), zinc oxynitride (ZnON), indium zinc tin oxide (IZTO), amorphous silicon (a-Si), polycrystalline silicon (p-Si), hexathiophene, or polythiophene, etc., and the present disclosure is applicable to transistors manufactured based on oxide technology, silicon technology, or organic substance technology.

In an exemplary embodiment, the first insulating layer and the second insulating layer may adopt any one or more of silicon oxide (SiOx), silicon nitride (SiNx), and silicon oxynitride (SiON), and may be a single layer, multiple layers, or a composite layer. The first insulating layer may be called a gate insulating (GI) layer, and the second insulating layer may be called an interlayer insulating (ILD) layer.

In an exemplary embodiment, the gate electrode and the source-drain electrodes may adopt a metal material, e.g., any one or more of Argentum (Ag), Copper (Cu), Aluminum (Al), Titanium (Ti), and Molybdenum (Mo), or an alloy material of the above metals, e.g., an Aluminum-Neodymium alloy (AlNd) or a Molybdenum-Niobium alloy (MoNb), and may be in a single-layer structure, or a multilayer composite structure such as Ti/Al/Ti or the like.

In an exemplary embodiment, the first planarization layer and the second planarization layer may adopt an organic material such as polyimide, acrylic, or polyethylene terephthalate, etc.

In an exemplary embodiment, as shown in FIGS. 3 to 20, the light emitting structure layer may include: a first light emitting element, a second light emitting element, and a pixel defining layer 220. The light emitting element may include: an anode 221, a light emitting layer 221, and a cathode 223.

In an exemplary embodiment, as shown in FIGS. 3 to 20, a pixel opening is provided in the pixel defining layer 220, the pixel opening exposes the anode 221, the light emitting layer 222 is disposed in the pixel opening, the cathode 223 is disposed in the light emitting layer 222, and the light emitting layer 222 emits out light rays of a corresponding color under an action of a voltage applied by the anode 221 and the cathode 223.

In an exemplary embodiment, the pixel defining layer 220 may adopt polyimide, acrylic, or polyethylene terephthalate.

In an exemplary embodiment, as shown in FIGS. 3 to 20, the pixel circuit is electrically connected with the anode 221 of the light emitting element through the anode connecting line 215.

In an exemplary embodiment, cathodes 223 of multiple second light emitting elements may be in a planar structure.

In an exemplary embodiment, the circuit structure layer also includes: a cathode connecting line, and the cathodes 223 of the multiple second light emitting elements are in a block structure and are disposed at an interval, wherein cathodes 223 of adjacent second light emitting elements are electrically connected through the cathode connecting line, and the cathode connecting line is disposed in a same layer as the cathodes 223.

In an exemplary embodiment, the cathode connecting line may be a transparent wire.

In the present disclosure, FIGS. 3 to 11 and FIGS. 14 to 19 take as an illustration that cathodes 223 of multiple light emitting elements may be in a planar structure, and FIGS. 3 to 11 and FIGS. 14 to 19 may also show that the cathodes 223 of the multiple second light emitting elements be in a block structure and are disposed at an interval, and cathodes 223 of adjacent light emitting elements are electrically connected through the cathode connecting line. FIG. 12, FIG. 13, and FIG. 20 take as an illustration that the cathodes 223 of the multiple second light emitting elements are in a block structure and are disposed at an interval, and the cathodes 223 of the adjacent second light emitting elements are electrically connected by the cathode connecting line.

In an exemplary embodiment, combined with FIGS. 3 to 13 and FIG. 21, the first touch assembly may include: multiple first touch structures 310 extending along a first direction D1 and multiple second touch structures 320 extending along a second direction D2, wherein the multiple first touch structures 310 are arranged along the second direction D2, and the multiple second touch structures 320 are arranged along the first direction D1.

In an exemplary embodiment, combined with FIGS. 3 to 13 and FIG. 21, the first touch structure 310 includes multiple first touch electrodes 311 and multiple first connecting parts 312, and the second touch structure 320 includes multiple second touch electrodes 321 and multiple second connecting parts 322, wherein the first direction and the second direction intersect, and the first touch electrodes 311 and the second touch electrodes 321 constitute a first touch electrode unit.

In an exemplary embodiment, combined with FIGS. 3 to 13 and FIG. 21, a first touch electrode 311, a second touch electrode 321, and one connecting part of the first connecting part 312 and the second connecting part 322 are disposed in a same layer, and are disposed in a different layer from the other connecting part of the first connecting part 312 and the second connecting part 322. FIGS. 3 to 13 and FIG. 21 take as an illustration that the first connecting part 312 is disposed in a same layer as the first touch electrode 311 and the second touch electrode 321.

In an exemplary embodiment, the first touch electrode 311 and the second touch electrode 321 may be disposed in a same layer as the first connecting part 312. The first touch electrode 311 and the first connecting part 312 may be in an interconnected integral structure, or the multiple first touch electrodes 311, the multiple second touch electrodes 321, and the multiple second connecting parts 322 may be disposed in a same layer, wherein the second touch electrodes 321 and the second connecting parts 322 may be in an interconnected integral structure.

In an exemplary embodiment, the first touch structure 310 may be a drive electrode (Tx), and the second touch structure 320 may be an induction electrode (Rx), or, the first touch structure 310 may be an induction electrode (Rx), and the second touch structure 320 may be a drive electrode (Tx), which is not limited in the present disclosure.

In an exemplary embodiment, the first touch electrode and the second touch electrode may have a rhombus shape, for example, it may be a regular diamond, a horizontally long diamond, or a vertically long diamond, or the first touch electrode and the second touch electrode may have any one or more of a triangle, a square, a trapezoid, a parallelogram, a pentagon, a hexagon, and other polygons, which is not limited in the present disclosure here.

FIG. 21 takes the first touch electrode and the second touch electrode being quadrilaterals as an example for an illustration.

In an exemplary embodiment, quantities of the first touch structures 310 and the second touch structures 320 may be set according to a touch accuracy.

In an exemplary embodiment, combined with FIGS. 3 to 13 and FIG. 21, the touch structure layer may include a first touch electrode 311, a second touch electrode 321, a first connecting part 312, and a second connecting part 322; the touch structure layer also includes a buffer layer 351, a touch insulating layer 352, and a protective layer 353 which are sequentially stacked on the base substrate 10.

In an exemplary embodiment, the buffer layer and the touch insulating layer may adopt any one or more of silicon oxide (SiOx), silicon nitride (SiNx), and silicon oxynitride (SiON), and may be in a single layer, multiple layers, or a composite layer.

In an exemplary embodiment, the protective layer may adopt a glass cover plate.

In an exemplary embodiment, combined with FIGS. 3 to 13 and FIG. 21, the first touch electrode 311, the second touch electrode 321, and a connecting part disposed in a same layer as the first touch electrode 311 are located between the touch insulating layer 352 and the protective layer 353, and a connecting part disposed in a different layer from the first touch electrode 311 are located between the buffer layer 351 and the touch insulating layer 352.

In an exemplary embodiment, combined with FIGS. 3 to 13 and FIG. 21, both the first touch electrode 311 and the second touch electrode 321 are metal touch electrodes.

In an exemplary embodiment, combined with FIGS. 3 to 13 and FIG. 21, the connecting part disposed in the same layer as the first touch electrode 311 is a metal touch connecting part.

In an exemplary embodiment, combined with FIGS. 3 to 13 and FIG. 21, the connecting part disposed in a different layer from the first touch electrode 311 may be a metal touch connecting part or a transparent touch connecting part.

In an exemplary embodiment, combined with FIGS. 14 to 20 and FIG. 22, the first touch assembly may include multiple first touch structures 310 extending along the first direction and multiple second touch structures 320 extending along the first direction, wherein the multiple first touch structures 310 are arranged along the second direction, and the multiple second touch structures 320 are arranged along the second direction.

In an exemplary embodiment, combined with FIGS. 14 to 20 and FIG. 22, the first touch structure 310 includes multiple first touch electrodes 311 and multiple first connecting parts 312, and the second touch structure 320 includes multiple second touch electrodes 321 and multiple second connecting parts 322, wherein the first touch electrodes 311 and the second touch electrodes 321 are alternately disposed along the second direction, and the first touch electrodes 311 and the second touch electrodes 321 constitute a first touch electrode 311 unit.

In an exemplary embodiment, combined with FIGS. 14 to 20 and FIG. 22, the first touch electrodes 311, the second touch electrodes 321, the first connecting parts 312, and the second connecting parts 322 are disposed in a same layer.

In an exemplary embodiment, combined with FIGS. 14 to 20 and FIG. 22, the touch structure layer may include a first touch electrode 311, a second touch electrode 321, a first connecting part 312, and a second connecting part 322; the touch structure layer also includes a buffer layer 351 and a protective layer 353 which are sequentially stacked on the base substrate 10.

In an exemplary embodiment, the buffer layer may adopt any one or more of silicon oxide (SiOx), silicon nitride (SiNx), and silicon oxynitride (SiON), and may be a single layer, multiple layers, or a composite layer.

In an exemplary embodiment, the protective layer may adopt a glass cover plate.

In an exemplary embodiment, combined with FIGS. 14 to 20 and FIG. 22, the first touch electrode 311, the second touch electrode 321, the first connecting part 312, and the second connecting part 322 are located between the buffer layer 351 and the protective layer 353.

In an exemplary embodiment, combined with FIGS. 14 to 20 and FIG. 22, the first touch electrode 311 and the second touch electrode 321 are metal touch electrodes, and the first connecting part 312 and the second connecting part 322 are metal touch connecting parts.

In an exemplary embodiment, combined with FIGS. 3 to 5, FIGS. 10 to 13, FIGS. 18 to 20 to 23, the second touch assembly may include multiple third touch structures 330 and multiple fourth touch structures 340, wherein the multiple third touch structures 330 are arranged along the second direction D2, and the multiple fourth touch structures 340 are arranged along the first direction D1; a third touch structure 330 includes multiple third touch electrodes 331 and multiple third connecting parts 332, and a fourth touch structure 340 includes multiple fourth touch electrodes 341 and multiple fourth connecting parts 342; and the third touch electrode 331 and the fourth touch electrode 341 constitute a second touch electrode unit.

In an exemplary embodiment, combined with FIGS. 3 to 5, FIGS. 10 to 13, FIGS. 18 to 20, and FIG. 23, the third touch electrode 331, the fourth touch electrode 341 are disposed in a same layer as one connecting part of the third connecting part 332 and the fourth connecting part 342, and are disposed in a different layer from the other connecting part of the third connecting part 332 and the fourth connecting part 342.

In an exemplary embodiment, the third touch electrode 331 and the fourth touch electrode 341 may be disposed in a same layer as the third connecting part 332. The third touch electrode 331 and the third connecting part 332 may be in an interconnected integral structure, or multiple third touch electrodes 331, multiple fourth touch electrodes 341, and multiple fourth connecting parts 342 may be disposed in a same layer, and the fourth touch electrode 341 and the fourth connecting part 342 may be in an interconnected integral structure.

In an exemplary embodiment, the third touch structure 330 may be a drive electrode (Tx), and the fourth touch structure 340 may be an induction electrode (Rx), or, the third touch structure 330 may be an induction electrode (Rx), and the fourth touch structure 340 may be a drive electrode (Tx), which is not limited by the present disclosure.

In an exemplary embodiment, the third touch electrode and the fourth touch electrode may have a rhombus shape, for example, it may be a regular diamond, a horizontally long diamond, or a vertically long diamond, or, the third touch electrode and the fourth touch electrode may have any one or more of a triangle, a square, a trapezoid, a parallelogram, a pentagon, a hexagon, and other polygons, which is not limited in the present disclosure here. FIG. 21 takes the third touch electrode and the fourth touch electrode being quadrilaterals as an example for an illustration.

In an exemplary embodiment, quantities of the third touch structures 330 and the fourth touch structures 340 may be set according to a touch accuracy.

In an exemplary embodiment, as shown in FIG. 23, when the second touch assembly may include multiple third touch structures 330 extending along the first direction and multiple fourth touch structures 340 extending along the second direction, adjacent third touch structures are symmetrical with respect to a virtual straight line VL extending along the first direction, and adjacent fourth touch structures are symmetrical with respect to the virtual straight line VL extending along the first direction.

In an exemplary embodiment, as shown in FIG. 23, the third connecting part extends along the first direction D1, and the fourth connecting part extends along the second direction D2.

In an exemplary embodiment, as shown in FIG. 23, a shape of the third touch electrode includes one opening, orientations of openings of adjacent third touch electrodes arranged along the second direction are opposite, and the fourth touch electrode is located between two third touch electrodes with opposite openings and arranged along the second direction.

In an exemplary embodiment, as shown in FIG. 23, a shape of a region surrounded by the third touch electrode and an adjacent fourth touch electrode is adapted to a shape of the pixel island. Exemplarily, a shape of the third touch electrode may be a circular arc shape or a multilateral shape lacking one side.

In an exemplary embodiment, as shown in FIG. 23, when the shape of the pixel island is a square, the second touch assembly may include multiple third touch structures 330 extending along the first direction and multiple fourth touch structures 340 extending along the second direction, and the third touch electrode 331 may include a first electrode part 331A, a second electrode part 331B, and a third electrode part 331C. The first electrode part 331A and the third electrode part 331C extend along the second direction, and the second electrode part 331B extends along the first direction. One end of the first electrode part 331A is electrically connected with one end of the second electrode part 331B, the other end of the first electrode part 331A is electrically connected with one end of a third electrode part of one adjacent third touch electrode through the third connecting part 332, the other end of the second electrode part 331B is electrically connected with one end of the third electrode part 331C, and the other end of the third electrode part 331C is electrically connected with one end of the first electrode part 331A of another adjacent third touch electrode 331 through the third connecting part 332.

In an exemplary embodiment, as shown in FIG. 23, when the second touch assembly may include multiple third touch structures 330 extending along the first direction and multiple fourth touch structures 340 extending along the second direction, the fourth touch electrode 341 may include a fourth electrode part 341A, a fifth electrode part 341B, and a sixth electrode part 341C; the fourth electrode part 341A and the sixth electrode part 341C extend along the second direction, and the fifth electrode part 341B extends along the first direction, wherein the fourth electrode part 341A and the sixth electrode part 341C are arranged along the first direction, and the fifth electrode part 341B is electrically connected with a middle part of the fourth electrode part 341A and a middle part of the sixth electrode part 341C, respectively. One virtual straight line extending along the second direction passes through the first electrode part 331A of the third touch electrode 331 and the fourth electrode part 341A of the fourth touch electrode 341, and another virtual straight line extending along the second direction passes through the third electrode part 331C of the third touch electrode 331 and the sixth electrode part 341C of the fourth touch electrode 341.

In an exemplary embodiment, combined with FIGS. 3 to 5, FIGS. 10 to 13, and FIGS. 18 to 20 to 23, when the first touch assembly includes multiple first touch structures 310 extending along the first direction and multiple second touch structures 320 extending along the second direction, the touch structure layer may also include a third touch electrode 331, a fourth touch electrode 341, a third connecting part 332, and a fourth connecting part 342.

In an exemplary embodiment, as shown in FIGS. 3 to 5 and FIGS. 10 to 13, the third touch electrode 331, the fourth touch electrode 341, and a connecting part disposed in a same layer as the third touch electrode 331 are located between the touch insulating layer 352 and the protective layer 353, and a connecting part disposed in a different layer from the third touch electrode 331 is located between the buffer layer 351 and the touch insulating layer 352. FIGS. 3 to 5 and FIGS. 10 to 13 take the fourth connecting part and the third touch electrode 331 being disposed in different layers as an example for an illustration.

In an exemplary embodiment, the third touch electrode 331 and the fourth touch electrode 341 may be metal touch electrodes, and the connecting part disposed in the same layer as the third touch electrode 331 is a metal touch connecting part. When the third touch electrode 331 and the fourth touch electrode 341 may be metal touch electrodes, and the connecting part disposed in the same layer as the third touch electrode 331 is a metal touch connecting part, the third touch electrode and the fourth touch electrode, and the connecting part disposed in the same layer as the third touch electrode 331 may be made by a same process as the first touch electrode and a second touch electrode, which may simplify a manufacturing process of the touch display substrate.

In an exemplary embodiment, the third touch electrode 331 and the fourth touch electrode 341 may be transparent touch electrodes, and the connecting part disposed in the same layer as the third touch electrode 331 may be a transparent touch connecting part. The third touch electrode 331 and the fourth touch electrode 341 may be transparent touch electrodes, and the connecting part disposed in the same layer as the third touch electrode 331 may be a transparent touch connecting part, which may improve light transmittance of the second display region.

In an exemplary embodiment, the connecting part disposed in the different layer from the third touch electrode 331 may be a metal touch connecting part or may be a transparent touch connecting part.

In an exemplary embodiment, when the third touch electrode 331 and the fourth touch electrode 341 may be transparent touch electrodes, the connecting part disposed in the same layer as the third touch electrode 331 may be a transparent touch connecting part, and the connecting part disposed in the different layer from the third touch electrode 331 may be a metal touch connecting part, an area of the third touch electrode 331 and the fourth touch electrode 341 may be greater than the area of the fourth connecting part 342. The area of the third touch electrode 331 and the fourth touch electrode 341 being greater than the area of the fourth connecting part 342 may improve the light transmittance of the second display region.

In an exemplary embodiment, as shown in FIGS. 10, 11, and 18, the first planarization layer 213 includes a first sub-planarization layer 213A and a second sub-planarization layer 213B, wherein the second sub-planarization layer 213B is located at one side of the first sub-planarization layer 213A away from the base substrate 10. The anode connecting line 215 may include a first anode connecting line 215A and a second anode connecting line 215B disposed in different layers, wherein the first anode connecting line 215A is located between the first sub-planarization layer 213A and the second sub-planarization layer 213B, and the second anode connecting line 215B is located between the second sub-planarization layer 213B and the second planarization layer 214.

In an exemplary embodiment, as shown in FIGS. 10, 11, and 18, the display structure layer may also include: a third touch electrode 331, a fourth touch electrode 341, a third connecting part 332, and a fourth connecting part 342. The third touch electrode 331, the fourth touch electrode 341, and the connecting part disposed in the same layer as the third touch electrode 331 are disposed in a same layer as the second anode connecting line 215B, and the connecting part disposed in the different layer from the third touch electrode 331 is disposed in a same layer as the first anode connecting line 215A.

In an exemplary embodiment, as shown in FIGS. 10, 11, and 18, the third touch electrode 331 and the fourth touch electrode 341 are transparent touch electrodes, and the third connecting part 332 and the fourth connecting part 342 are transparent touch connecting parts.

In an exemplary embodiment, as shown in FIGS. 10, 11, and 18, the third touch structure and the fourth touch structure are disposed in a same layer as the anode connecting line, and adopt a same transparent material, so that stacking of the metal layer in the second display region is less, reducing an overlapping capacitance and a load, which is beneficial to achieving a brightness by the touch display substrate in sufficient time, improving a reliability of the touch display substrate.

In an exemplary embodiment, as shown in FIGS. 10, 11, and 18, an orthographic projection of the third touch electrode 331 and the fourth touch electrode 341 on the base substrate 10 is at least partially overlapped with an orthographic projection of the light emitting layer 222 on the base substrate 10. By placing the third touch electrode 331 and the fourth touch electrode 341 below the light emitting layer 222 in the present disclosure, an influence of a manufacturing process of the light emitting structure layer on the third touch electrode 331 and the fourth touch electrode 341 may be prevented, and a touch sensitivity of the touch display substrate may be improved.

In an exemplary embodiment, as shown in FIG. 12, when the first touch assembly includes multiple first touch structures 310 extending along the first direction and multiple second touch structures 320 extending along the second direction, and cathodes 223 of adjacent light emitting elements are disposed at an interval, the touch structure layer may also include a third touch electrode 331, a fourth touch electrode 341, and the connecting part disposed in the same layer as the third touch electrode 331, and the display structure layer also includes the connecting part disposed in the different layer from the third touch electrode 331.

In an exemplary embodiment, as shown in FIG. 12, the third touch electrode 331, the fourth touch electrode 341, and the connecting part disposed in the same layer as the third touch electrode 331 are located between the touch insulating layer 352 and the protective layer 353, and the connecting part disposed in the different layer from the third touch electrode 331 is disposed in the same layer as the anode connecting line 215.

In an exemplary embodiment, the third touch electrode 331 and the fourth touch electrode 341 are metal touch electrodes, and the connecting part disposed in the same layer as the third touch electrode 331 is a metal touch connecting part.

In an exemplary embodiment, the third touch electrode 331 and the fourth touch electrode 341 are transparent touch electrodes, and the connecting part disposed in the same layer as the third touch electrode 331 is a transparent touch connecting part.

In an exemplary embodiment, the connecting part disposed in the different layer from the third touch electrode 331 is a transparent touch connecting part.

In an exemplary embodiment, as shown in FIG. 12, the connecting part disposed in the different layer from the third touch electrode 331 is electrically connected with the connected touch electrode through vias opened in the second planarization layer 214, the pixel defining layer 220, the buffer layer 351, and the touch insulating layer 352.

In an exemplary embodiment, as shown in FIG. 20, when the first touch assembly includes multiple first touch structures 310 extending along the first direction and multiple second touch structures 320 extending along the first direction, and the cathodes 223 of the adjacent light emitting elements are disposed at an interval, the touch structure layer also includes the third touch electrode 331, the fourth touch electrode 341, and the connecting part disposed in the same layer as the third touch electrode 331, and the display structure layer also includes the connecting part disposed in the different layer from the third touch electrode 331.

In an exemplary embodiment, as shown in FIG. 20, the third touch electrode 331, the fourth touch electrode 341, and the connecting part disposed in the same layer as the third touch electrode 331 are located between the buffer layer 351 and the protective layer 353, and the connecting part disposed in the different layer from the third touch electrode 331 is disposed in the same layer as the anode connecting line 215.

In an exemplary embodiment, the third touch electrode 331 and the fourth touch electrode 341 may be metal touch electrodes, and the connecting part disposed in the same layer as the third touch electrode 331 may be a metal touch connecting part.

In an exemplary embodiment, the third touch electrode 331 and the fourth touch electrode 341 may be transparent touch electrodes, and the connecting part disposed in the same layer as the third touch electrode 331 may be a transparent touch connecting part.

In an exemplary embodiment, the connecting part disposed in the different layer from the third touch electrode 331 is a transparent touch connecting part.

In an exemplary embodiment, the connecting part disposed in the different layer from the third touch electrode 331 is electrically connected with the connected touch electrode through vias opened in the second planarization layer 214, the pixel defining layer 220, and the buffer layer 351.

In an exemplary embodiment, as shown in FIG. 13, when the first touch assembly includes multiple first touch structures 310 extending along the first direction and multiple second touch structures 320 extending along the second direction, and cathodes 223 of adjacent light emitting elements are disposed at an interval, the touch structure layer may also include the connecting part disposed in the different layer from the third touch electrode 331, and the display structure layer may also include the third touch electrode 331, the fourth touch electrode 341, and the connecting part disposed in the same layer as the third touch electrode 331.

In an exemplary embodiment, as shown in FIG. 13, the connecting part disposed in the different layer from the third touch electrode 331 may be located between the buffer layer 351 and the touch insulating layer 352, and the third touch electrode 331, the fourth touch electrode 341, and the connecting part disposed in the same layer as the third touch electrode 331 may be disposed in the same layer as the anode connecting line 215.

In an exemplary embodiment, the third touch electrode 331 and the fourth touch electrode 341 are transparent touch electrodes, and the connecting part disposed in the same layer as the third touch electrode 331 is a transparent touch connecting part.

In an exemplary embodiment, the connecting part disposed in the different layer from the third touch electrode 331 is a transparent touch connecting part or a metal touch connecting part.

In an exemplary embodiment, as shown in FIG. 13, the connecting part disposed in the different layer from the third touch electrode 331 is electrically connected with the connected touch electrode through vias opened in the second planarization layer 214, the pixel defining layer 220, and the buffer layer 351.

In an exemplary embodiment, as shown in FIG. 13, an orthographic projection of the third touch electrode 331 and the fourth touch electrode 341 on the base substrate 10 is at least partially overlapped with an orthographic projection of the light emitting layer 222 on the base substrate 10. By placing the third touch electrode 331 and the fourth touch electrode 341 below the light emitting layer 222 in the present disclosure, an influence of a manufacturing process of the light emitting structure layer on the third touch electrode 331 and the fourth touch electrode 341 may be prevented, and a touch sensitivity of the touch display substrate may be improved.

In an exemplary embodiment, as shown in FIGS. 6 to 9, FIG. 12, FIG. 14 to 17, FIG. 24, and FIG. 25, the second touch assembly may include multiple third touch structures 330 extending along the first direction and multiple fourth touch structures 340 extending along the first direction, wherein the multiple third touch structures 330 are arranged along the second direction, and the third touch structures 330 and the fourth touch structures 340 are alternately disposed along the second direction.

In an exemplary embodiment, as shown in FIGS. 6 to 9, FIG. 12, FIGS. 14 to 17, FIG. 24, and FIG. 25, the third touch structure 330 may include multiple third touch electrodes 331 and multiple third connecting parts 332, and the fourth touch structure 340 includes multiple fourth touch electrodes 341 and multiple fourth connecting parts 342, wherein the third touch electrodes 331 and the fourth touch electrodes 341 constitute a second touch electrode 321 unit.

In an exemplary embodiment, as shown in FIGS. 6 to 9, FIG. 12, FIGS. 14 to 17, FIG. 24, and FIG. 25, the third touch electrode 331, the fourth touch electrode 341, the third connecting part 332, and the fourth connecting part 342 are disposed in a same layer.

In an exemplary embodiment, as shown in FIG. 6, FIG. 7, and FIG. 12, when the second touch assembly includes multiple first touch structures 310 extending along the first direction and multiple second touch structures 320 extending along the second direction, the touch structure layer also includes the third touch electrode 331, the fourth touch electrode 341, the third connecting part 332, and the fourth connecting part 342. The third touch electrode 331, the fourth touch electrode 341, the third connecting part 332, and the fourth connecting part 342 are located between the touch insulating layer 352 and the protective layer 353.

In an exemplary embodiment, the third touch electrode 331 and the fourth touch electrode 341 are metal touch electrodes, and the third connecting part 332 and the fourth connecting part 342 are metal touch connecting parts.

In an exemplary embodiment, the third touch electrode 331 and the fourth touch electrode 341 are transparent touch electrodes, and the third connecting part 332 and the fourth connecting part 342 are transparent touch connecting parts.

In an exemplary embodiment, as shown in FIGS. 14 and 15, when the second touch assembly includes multiple first touch structures 310 extending along the first direction and multiple second touch structures 320 extending along the first direction, the third touch electrode 331, the fourth touch electrode 341, the third connecting part 332, and the fourth connecting part 342 are located between the buffer layer 351 and the protective layer 353.

In an exemplary embodiment, the third touch electrode 331 and the fourth touch electrode 341 are metal touch electrodes, and the third connecting part 332 and the fourth connecting part 342 are metal touch connecting parts.

In an exemplary embodiment, the third touch electrode 331 and the fourth touch electrode 341 are transparent touch electrodes, and the third connecting part 332 and the fourth connecting part 342 are transparent touch connecting parts.

In an exemplary embodiment, as shown in FIGS. 8, 9, 16, and 17, when the second touch assembly includes multiple first touch structures 310 extending along the first direction and multiple second touch structures 320 extending along the first direction, the display structure layer also includes the third touch electrode 331, the fourth touch electrode 341, the third connecting part 332, and the fourth connecting part 342. The third touch electrode 331, the fourth touch electrode 341, the third connecting part 332, and the fourth connecting part 342 are disposed in a same layer as the anode connecting line 215.

In an exemplary embodiment, the third touch electrode 331 and the fourth touch electrode 341 are transparent touch electrodes, and the third connecting part 332 and the fourth connecting part 342 are transparent touch connecting parts. The third touch electrode 331 and the fourth touch electrode 341 are transparent touch electrodes, and the third connecting part 332 and the fourth connecting part 342 being transparent touch connecting parts may ensure the light transmittance of the second display region.

In an exemplary embodiment, an orthographic projection of the third touch electrode 331 and the fourth touch electrode 341 on the base substrate 10 is at least partially overlapped with an orthographic projection of the light emitting layer 222 on the base substrate 10. By placing the third touch electrode 331 and the fourth touch electrode 341 below the light emitting layer 222 in the present disclosure, the influence of the manufacturing process of the light emitting structure layer on the third touch electrode 331 and the fourth touch electrode 341 may be prevented, and the touch sensitivity of the touch display substrate may be improved.

In an exemplary embodiment, as shown in FIGS. 24 and 25, the third touch structure 330 and the fourth touch structure 340 are symmetrical with respect to the virtual straight line VL extending along the first direction, and a shape of a region surrounded by the third touch structure and an adjacent fourth touch structure is adapted to a shape of the pixel island.

In an exemplary embodiment, as shown in FIG. 24, when the shape of the pixel island is a circle, the third touch electrode 331 and the fourth touch electrode 341 are strip-shaped electrodes, the virtual straight line extending along the second direction passes through the third touch electrode 331 and the fourth touch electrode 341, and the virtual straight line extending along the second direction passes through the third connecting part 332 and the fourth connecting part 342.

In an exemplary embodiment, as shown in FIG. 24, the third connecting part 332 and the fourth connecting part 342 include: a first straight line connecting part L1, a second straight line connecting part L2, a first non-straight line connecting part UL1, and a second non-straight line connecting part UL2, wherein the first straight line connecting part L1 and the second straight line connecting part L2 extend along the second direction and are arranged along the first direction. One end of the first straight line connecting part L1 is connected to one end of the first non-straight line connecting part UL1, and the other end of the first straight line connecting part L2 is connected to one end of the second non-straight line connecting part UL2. One end of the second straight line connecting part L2 is connected to the other end of the first non-straight line connecting part UL1, and one end of the second straight line connecting part L2 is connected to the other end of the second non-straight line connecting part UL2; the first non-straight line connecting part UL1 and the second non-straight line connecting part UL2 are symmetrical with respect to the virtual straight line extending along the first direction;

In an exemplary embodiment, as shown in FIG. 24, a shape of the first non-straight line connecting part may include: a circular arc shape or a broken line shape formed by multiple straight line segments.

In an exemplary embodiment, as shown in FIG. 25, when the shape of the pixel island is a circle, shapes of the third touch electrodes 331 and the fourth touch electrodes 341 are circular arc shapes, and shapes of the third connecting parts 332 and the fourth connecting parts 342 are straight line shapes and extend along the first direction.

In an exemplary embodiment, as shown in FIG. 25, the third touch electrodes 331 and the fourth touch electrodes 341 are symmetrical with respect to the virtual straight line VL extending along the first direction.

In an exemplary embodiment, as shown in FIG. 25, the anode connecting line includes a circular arc connecting part and a straight line connecting part disposed at an interval; a bending direction of the circular arc connecting part coincides with a bending direction of the third touch electrode 331, and the circular arc connecting part is disposed in parallel with the third touch electrode 331, and the straight line connecting part is disposed in parallel with the third connecting part 332 and the fourth connecting part 342.

In an exemplary embodiment, a region surrounded by the third touch electrode 331 and an adjacent fourth touch electrode 341 may be of a square, a circle, or other shapes, which may be determined according to the shapes of the third touch electrode and the fourth touch electrode, which is not limited by the present disclosure.

In an exemplary embodiment, as shown in FIGS. 23 to 25, the pixel island is located in a region surrounded by the third touch electrode 331 and the adjacent fourth touch electrode 341.

In an exemplary embodiment, a density of the first touch electrode unit may be greater than a density of the second touch electrode unit.

In an exemplary embodiment, as shown in FIG. 26, the touch display substrate may also include: a first touch trace 101, a second touch trace 102, a third touch trace 103, and a fourth touch trace 104 located in the display structure layer. The first touch trace is electrically connected with the first touch electrode 311, the second touch trace is electrically connected with the second touch electrode 321, the third touch trace is electrically connected with the third touch electrode 331, and the fourth touch trace is electrically connected with the fourth touch electrode 341.

In an exemplary embodiment, as shown in FIG. 26, when the third touch electrode 331 and the fourth touch electrode 341 are transparent electrodes, the third touch trace 103 includes a trace part 103A and a compensating part 103B, wherein a width of the compensating part 103B is greater than a width of the trace part 103A; and the second touch trace. The fourth touch trace 104 includes: a trace part 104A and a compensating part 104B, wherein a width of the compensating part 104B is greater than a width of the trace part 104A.

In an exemplary embodiment, as shown in FIG. 26, a width of the trace part is greater than or equal to the width of the first touch trace and the second touch trace.

In the present disclosure, the width of the compensating part 103B of the third touch trace and the fourth touch trace is greater than the width of the first touch trace and the second touch trace, which may compensate a load difference between the second touch assembly located in the second display region and the first touch assembly located in the first display region, and ensure a touch uniformity of the touch display substrate.

In an exemplary embodiment, as shown in FIGS. 3 to 20, the touch display substrate may also include: a filter structure layer located at one side of the touch structure layer 30 away from the display structure layer 20, wherein the filter structure layer includes a filter layer 42 and a black matrix layer 41.

In an exemplary embodiment, an orthographic projection of the filter layer 42 on the base substrate is at least partially overlapped with an orthographic projection of the light emitting layer of the light emitting element on the base substrate.

In an exemplary embodiment, an orthographic projection of the black matrix layer 41 on the base substrate is at least partially overlapped with an orthographic projection of the pixel defining layer on the base substrate.

In an exemplary embodiment, the orthographic projection of the black matrix layer 41 on the base substrate is at least partially overlapped with an orthographic projection of the metal touch electrodes and/or the metal touch connecting parts on the base substrate. In the present application, by stacking metal structures in the black matrix layer and the touch structure layer, a light shading area of the second display region may be reduced and light transmittance of the second display region may be improved.

FIG. 3, FIG. 4, and FIGS. 6 to 20 take the fourth connecting part being a metal touch connecting part and the third touch electrode and the fourth touch electrode being the transparent touch electrodes as an example for an illustration. At this time, the orthographic projection of the black matrix layer on the base substrate covers an orthographic projection of the fourth connecting part. FIG. 5 takes the third touch electrode and the fourth touch electrode being the metal touch electrodes and the third connecting part and the fourth connecting part being the metal touch connecting parts as an example for an illustration. At this time, the orthographic projection of the black matrix layer on the base substrate covers an orthographic projection of the third touch electrode, the fourth touch electrode, the third connecting part, and the fourth connecting part on the base substrate.

In an exemplary embodiment, the touch structure layer may be formed on the display structure layer or may be attached to the display structure layer in a plug-in form. FIG. 3, FIG. 5, FIG. 6, FIG. 8, FIG. 10, FIG. 12 to FIG. 14, FIG. 16, FIG. 18, and FIG. 20 take the touch structure layer formed on the display structure layer as an example for an illustration. FIG. 4, FIG. 7, FIG. 9, FIG. 11, FIG. 15, FIG. 17, and FIG. 19 take the touch structure layer attached to the display structure layer as an example for an illustration. When the second touch assembly is located in the touch structure layer or the display structure layer, the touch structure layer may be formed on the display structure layer or may be attached to the display structure layer in a plug-in form; and when the second touch assembly is located in the touch structure layer and the display structure layer, the touch structure layer is formed on the display structure layer. However, no limits are made thereto in the present disclosure.

In an exemplary embodiment, as shown in FIG. 4, FIG. 7, FIG. 9, FIG. 11, FIG. 15, FIG. 17, and FIG. 19, when the second touch assembly is located in the touch structure layer or the display structure layer, the touch display substrate may also include: an encapsulating layer 50 and an adhesive layer 60 disposed between the display structure layer and the touch structure layer.

In an exemplary embodiment, the encapsulating layer 50 is located at a side of the adhesive layer 60 close to the base substrate 10. And an orthographic projection of it on the base substrate covers the pixel island and a region between adjacent pixel islands.

In the present disclosure, the touch structure layer is disposed on the display structure layer in a plug-in form, so that a distance between the touch structure layer and the cathode in the present disclosure is relatively large, which may reduce a load of the touch display substrate and reduce a parasitic capacitance, improving a touch sensitivity of the touch display substrate, and improving a reliability of the touch display substrate.

In an exemplary embodiment, a thickness of the encapsulating layer 50 may be about 5 microns to 15 microns. Exemplarily, the thickness of the encapsulating layer 50 may be about 10 microns.

In an exemplary embodiment, the encapsulating layer may include a first inorganic encapsulating layer, a second organic encapsulating layer, and a third inorganic encapsulating layer stacked on the display structure layer, wherein the first inorganic encapsulating layer and the third inorganic encapsulating layer may adopt an inorganic material, and the second organic encapsulating layer may adopt an organic material, which may ensure that external water vapor cannot enter the light emitting structure layer.

In an exemplary embodiment, a thickness of the adhesive layer 60 may be about 25 microns to 50 microns.

In an exemplary embodiment, the adhesive layer 60 may include: an optical transparent adhesive.

In an exemplary embodiment, when the touch structure layer is manufactured on the display structure layer and the second touch assembly includes a transparent touch electrode and/or a transparent touch connecting part, the transparent touch electrode and the transparent touch connecting part are made by adopting a low temperature sputtering process. In the low temperature sputtering process, under a certain vacuum environment, a damage of the sputtering process to a film layer below the touch structure layer is reduced by reducing a plasma energy, reducing an outgoing atomic energy, and reducing a temperature of the base substrate, which may reduce an influence on a life span and a brightness of a film-forming luminescent material and improve a reliability of the touch display substrate.

The touch display substrate according to the embodiment of the present disclosure may be applied to application scenarios of a high-frequency terminal device, such as front photographing, hand swimming, and the like.

In a second aspect, the disclosure also provides a touch display apparatus, which includes the aforementioned touch display substrate.

An embodiment of the present disclosure also provides a touch display apparatus, including: a touch display substrate.

In an exemplary embodiment, the touch display apparatus may be any product or component with a display function, such as an organic light-emitting diode (OLED) display apparatus, an active-matrix organic light-emitting diode (AMOLED) display apparatus, a mobile phone, a tablet computer, a flexible display apparatus, a television, or a display, etc. The accompanying drawings of the present disclosure only involve the structures involved in the embodiments of the present disclosure, and other structures may refer to usual designs.

The display substrate may be the display panel provided in any aforementioned one of the above embodiments, and their implementation principles and implementation effects are similar, and will not be repeated herein.

In an exemplary embodiment, the touch display apparatus may also include: a photosensitive sensor.

In an exemplary embodiment, the photosensitive sensor is disposed in the second display region, and an orthographic projection of it on the base substrate is at least partially overlapped with the second display region. Outside ambient light may be incident into the photosensitive sensor through the second display region.

In an exemplary embodiment, the second display region may be rectangular, and an area of an orthographic projection of the photosensitive sensor on the base substrate may be less than or equal to an area of an inscribed circle of the second display region. That is, a size of a region where the photosensitive sensor is located may be less than or equal to a size of the inscribed circle of the second display region. For example, the size of the region where the photosensitive sensor is located is equal to the size of the inscribed circle of the second display region, that is, a shape of the region where the photosensitive sensor is located may be circular, and correspondingly, the region where the photosensitive sensor is located may also be called a light transmission hole.

In an exemplary embodiment, the photosensitive sensor may include at least one of a camera module (e.g., a front camera module), a 3D structured light module (e.g., a 3D structured light sensor), a time-of-flight 3D imaging module (e.g., a time-of-flight sensor), an infrared sensing module (e.g., an infrared sensing sensor), and the like.

In an exemplary embodiment, the front camera module is generally enabled when a user takes a selfie or a video call, and a display region of the display apparatus displays an image obtained by the selfie for the user to view. The front camera module includes, for example, a lens, an image sensor, an image processing chip, and the like. An optical image generated by scenery through the lens is projected onto a surface of the image sensor (the image sensor includes both of CCD and CMOS) and converted into electrical signals, which are converted into digital image signals after an analog-to-digital conversion by the image processing chip, and then sent to a processor for processing, outputting an image of the scenery on a display screen.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It can be understood that when an element such as a layer, film, region or substrate is described as being "on" or "under" another element, this element can be "directly" located "on" or "under" the other element, or an intermediate element may exist.

Although the implementation modes disclosed in the present disclosure are as above, the described contents are only implementation modes used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A touch display substrate, comprising: a display region and a non-display region, wherein the display region comprises a first display region and a second display region, the first display region surrounding at least one side of the second display region; the touch display substrate comprises a base substrate and a display structure layer and a touch structure layer disposed on the base substrate sequentially; the first display region comprises a first touch assembly, and the second display region comprises a second touch assembly;

the display structure layer comprises a plurality of pixel circuits located in the first display region and a plurality of light emitting elements located in the first display region and the second display region;

the first touch assembly is located in the touch structure layer, and the second touch assembly is located in the touch structure layer;

in a direction perpendicular to the base substrate, the display structure layer comprises a circuit structure layer and a light emitting structure layer which are sequentially stacked on the base substrate, and at least one light emitting element of the plurality of light emitting elements comprises an anode, a light emitting layer, and a cathode;

the light emitting structure layer comprises a first light emitting element and a second light emitting element;

the circuit structure layer comprises a cathode connecting line, and cathodes of a plurality of second light emitting elements are in a block-shaped structure and disposed at an interval, wherein cathodes of adjacent second light emitting elements are electrically connected through the cathode connecting line, the cathode connecting line is disposed in a same layer as the cathodes of the adjacent second light emitting elements, and the cathode connecting line is a transparent wire;

the display structure layer further comprises an anode connecting line;

the second touch assembly comprises: a plurality of third touch structures extending along the first direction and a plurality of fourth touch structures extending along the first direction;

at least one third touch structure of the plurality of third touch structures comprises a plurality of third touch electrodes and a plurality of third connecting parts, and at least one fourth touch structure of the plurality of fourth touch structures comprises a plurality of fourth touch electrodes and a plurality of fourth connecting parts; and the anode connecting line comprises circular arc connecting parts and straight line connecting parts disposed at an interval; a bending direction of a circular arc connecting part is consistent with a bending direction of a third touch electrode, and the circular arc connecting part is disposed in parallel with the third touch electrode, and a straight line connecting part is disposed in parallel with a third connecting part and a fourth connecting part.

2. The touch display substrate of claim 1, wherein the plurality of light emitting elements comprise the first light emitting element disposed in the first display region and the second light emitting element disposed in the second display region, and the display structure layer comprises a plurality of first sub-pixels located in the first display region and a plurality of second sub-pixels located in the second display region;

the first sub-pixel comprises a first pixel circuit and the first light emitting element connected with the first pixel circuit, and the second sub-pixel comprises the second light emitting element, wherein the first pixel circuit is disposed in the first display region; and a plurality of second sub-pixels constitute one pixel island, and a distance between adjacent pixel islands is greater than a distance between adjacent second sub-pixels located in a same pixel island.

3. The touch display substrate of claim 2, wherein the pixel circuit comprises a second pixel circuit disposed in the first display region, wherein the second pixel circuit is connected with the first light emitting element through the anode connecting line, and the anode connecting line comprises a transparent wire.

4. The touch display substrate of claim 3, wherein the circuit structure layer comprises the first pixel circuit and the second pixel circuit; and the first pixel circuit and the second pixel circuit comprise a transistor; and the circuit structure layer further comprises an active layer, a first insulating layer, a gate electrode, a second insulating layer, a source-drain electrode, a first planarization layer, the anode connecting line, and a second planarization layer which are sequentially stacked on the base substrate.

5. The touch display substrate of claim 4, wherein the first planarization layer comprises a first sub-planarization layer and a second sub-planarization layer, the second sub-planarization layer being located at one side of the first sub-planarization layer away from the base substrate, the anode connecting line comprises a first anode connecting line and a second anode connecting line disposed in different layers, wherein the first anode connecting line is located between the first sub-planarization layer and the second sub-planarization layer, and the second anode connecting line is located between the second sub-planarization layer and the second planarization layer.

6. The touch display substrate of claim 2, wherein the second sub-pixel further comprises a second pixel circuit connected with the second light emitting element, wherein the second pixel circuit is disposed in the second display region, and an orthographic projection of the second pixel circuit on the base substrate is overlapped with an orthographic projection of the pixel island on the base substrate.

7. The touch display substrate of claim 2, wherein the first touch assembly comprises: a plurality of first touch structures extending along a first direction and a plurality of second touch structures extending along a second direction, wherein the plurality of first touch structures are arranged along the second direction, and the plurality of second touch structures are arranged along the first direction; the first touch structure comprises a plurality of first touch electrodes and a plurality of first connecting parts, and a second touch structure comprises a plurality of second touch electrodes and a plurality of second connecting parts, wherein the first direction and the second direction intersect, and a first touch electrode and a second touch electrode constitute a first touch electrode unit;

the first touch electrode, the second touch electrode, and one connecting part of the first connecting part and the second connecting part are disposed in a same layer, and are disposed in a different layer from the other connecting part of the first connecting part and the second connecting part;

the touch structure layer comprises the first touch electrode, the second touch electrode, the first connecting part, and the second connecting part; the touch structure layer further comprises a buffer layer, a touch insulating layer, and a protective layer which are sequentially stacked on the base substrate;

the first touch electrode, the second touch electrode, and the connecting part disposed in the same layer as the first touch electrode are located between the touch insulating layer and the protective layer, and the connecting part disposed in the different layer from the first touch electrode is located between the buffer layer and the touch insulating layer;

the first touch electrode and the second touch electrode are metal touch electrodes, the connecting part disposed in the same layer as the first touch electrode is a metal touch connecting part, and the connecting part disposed in the different layer from the first touch electrode is a metal touch connecting part or a transparent touch connecting part.

8. The touch display substrate of claim 7, wherein when the first touch assembly comprises a plurality of first touch structures extending along the first direction and a plurality of second touch structures extending along the second direction, the touch structure layer further comprises the third touch electrode, a fourth touch electrode, the third connecting part, and the fourth connecting part;

the third touch electrode, the fourth touch electrode, and a connecting part disposed in a same layer as the third touch electrode are located between the touch insulating layer and the protective layer, and the connecting part disposed in the different layer from the third touch electrode is located between the buffer layer and the touch insulating layer;

the third touch electrode and the fourth touch electrode are metal touch electrodes, the connecting part disposed in the same layer as the third touch electrode is a metal touch connecting part, or the third touch electrode and the fourth touch electrode are transparent touch electrodes, and the connecting part disposed in the same layer as the third touch electrode is a transparent touch connecting part; and the connecting part disposed in the different layer from the third touch electrode is a metal touch connecting part or a transparent touch connecting part.

9. The touch display substrate of claim 8, further comprising:

an encapsulating layer and an adhesive layer disposed between the display structure layer and the touch structure layer; the encapsulating layer comprises: a first inorganic encapsulating layer, a second organic encapsulating layer, and a third inorganic encapsulating layer which are sequentially stacked on the display structure layer;

the encapsulating layer is located at one side of the adhesive layer close to the base substrate, and an orthographic projection of the encapsulating layer on the base substrate covers the pixel island and a region between adjacent pixel islands; and the adhesive layer comprises: an optical transparent adhesive.

10. The touch display substrate of claim 7, wherein the plurality of third touch structures are arranged along the second direction, the plurality of fourth touch structures are arranged along the second direction, and the third touch structures and the fourth touch structures are alternately disposed along the second direction; wherein the third touch electrode and a fourth touch electrode form a second touch electrode unit; and the third touch electrode, the fourth touch electrode, the third connecting part, and the fourth connecting part are disposed in a same layer.

11. The touch display substrate of claim 10, wherein when the second touch assembly comprises a plurality of first touch structures extending along the first direction and a plurality of second touch structures extending along the second direction, the touch structure layer further comprises the third touch electrode, the fourth touch electrode, the third connecting part, and the fourth connecting part;

the third touch electrode, the fourth touch electrode, the third connecting part, and the fourth connecting part are located between the touch insulating layer and the protective layer; and the third touch electrode and the fourth touch electrode are metal touch electrodes, and the third connecting part and the fourth connecting part are metal touch connecting parts, or the third touch electrode and the fourth touch electrode are transparent touch electrodes, and the third connecting part and the fourth connecting part are transparent touch connecting parts.

12. The touch display substrate of claim 10, wherein the third touch structures and the fourth touch structures are symmetrical with respect to a virtual straight line extending along the first direction; and a shape of a region surrounded by the at least one third touch structure and an adjacent fourth touch structure is adapted to a shape of the pixel island.

13. The touch display substrate of claim 12, wherein when the shape of the pixel island is a circle, shapes of the third touch electrode and the fourth touch electrode are circular arc shapes, and shapes of the third connecting part and the fourth connecting part are straight line shapes and extend along the first direction.

14. The touch display substrate of claim 7, further comprising: a filter structure layer located at one side of the touch structure layer away from the display structure layer, wherein the filter structure layer comprises a filter layer and a black matrix layer; the light emitting structure layer further comprises: a pixel defining layer;

an orthographic projection of the filter layer on the base substrate is at least partially overlapped with an orthographic projection of the light emitting layer of the at least one light emitting element on the base substrate, and an orthographic projection of the black matrix layer on the base substrate is at least partially overlapped with an orthographic projection of the pixel defining layer on the base substrate; and an orthographic projection of the black matrix layer on the base substrate is at least partially overlapped with an orthographic projection of the metal touch electrode and/or the metal touch connecting part on the base substrate.

15. The touch display substrate of claim 2, wherein the first touch assembly comprises: a plurality of first touch structures extending along a first direction and a plurality of second touch structures extending along the first direction, wherein the plurality of first touch structures are arranged along a second direction, and the plurality of second touch structures are arranged along the second direction; the first touch structure comprises a plurality of first touch electrodes and a plurality of first connecting parts, and the second touch structure comprises a plurality of second touch electrodes and a plurality of second connecting parts, wherein the first touch electrodes and the second touch electrodes are alternately disposed along the second direction, the first direction and the second direction intersect, and the first touch electrode and the second touch electrode constitute a first touch electrode unit;

the first touch electrode, the second touch electrode, the first connecting part, and the second connecting part are disposed in a same layer;

the touch structure layer comprises the first touch electrode, the second touch electrode, the first connecting part, and the second connecting part; the touch structure layer further comprises a buffer layer and a protective layer which are sequentially stacked on the base substrate;

the first touch electrode, the second touch electrode, the first connecting part, and the second connecting part are located between the buffer layer and the protective layer;

the first touch electrode and the second touch electrode are metal touch electrodes, and the first connecting part and the second connecting part are metal touch connecting parts.

16. The touch display substrate of claim 2, wherein the first display region comprises: a normal display region and a transition display region, wherein the normal display region surrounds at least one side of the transition display region, the transition display region surrounds at least one side of the second display region, and the second light emitting element in the second display region is electrically connected with a pixel circuit in the transition display region; and a sub-pixel density of the normal display region is greater than a sub-pixel density of the transition display region, and the sub-pixel density of the transition display region is greater than a sub-pixel density of the second display region.

17. A touch display apparatus, comprising: the touch display substrate of claim 1 and a photosensitive sensor, wherein an orthographic projection of the photosensitive sensor on the base substrate is at least partially overlapped with the second display region.

\* \* \* \* \*